United States Patent
Seed et al.

(10) Patent No.: US 9,992,279 B2
(45) Date of Patent: Jun. 5, 2018

(54) MANAGED OBJECT REPLICATION AND DELIVERY

(71) Applicant: Level 3 Communications, LLC, Broomfield, CO (US)

(72) Inventors: Steven L. Seed, Woodland Hills, CA (US); Kevin Hobbs, Vista, CA (US); Shane M. Glynn, Culver City, CA (US); Isaac W. Foraker, Winnetka, CA (US); Peter J. Jones, Thousand Oaks, CA (US); Homer H. Chen, Thousand Oaks, CA (US); William Patrick Greer, Issaquah, WA (US)

(73) Assignee: Level 3 Communications, LLC, Broomfield, CO (US)

( * ) Notice: Subject to any disclaimer, the term of this patent is extended or adjusted under 35 U.S.C. 154(b) by 452 days.

(21) Appl. No.: 14/887,053

(22) Filed: Oct. 19, 2015

(65) Prior Publication Data

US 2016/0044105 A1    Feb. 11, 2016

Related U.S. Application Data

(63) Continuation of application No. 10/073,938, filed on Feb. 14, 2002, now Pat. No. 9,167,036.

(51) Int. Cl.
*H04L 29/08* (2006.01)

(52) U.S. Cl.
CPC ...... *H04L 67/1095* (2013.01); *H04L 67/2814* (2013.01); *H04L 67/2842* (2013.01);
(Continued)

(58) Field of Classification Search
None
See application file for complete search history.

(56) References Cited

U.S. PATENT DOCUMENTS

| 4,495,570 A | 1/1985 | Kitajima et al. |
| 4,591,983 A | 5/1986 | Bennett et al. |

(Continued)

FOREIGN PATENT DOCUMENTS

| AU | 763380 | 6/2003 |
| CA | 2202572 | 10/1998 |

(Continued)

OTHER PUBLICATIONS

Wu, Kun-Lung, Philip S. Yu, and Joel L. Wolf. "Segment-based proxy caching of multimedia streams." Proceedings of the 10th international conference on World Wide Web. ACM, 2001.*

(Continued)

*Primary Examiner* — Jimmy H Tran

(57) ABSTRACT

A method, system and computer program product for managed object replication and delivery redirects, directly or indirectly, a client's request for an object that is not available at a best or optimal handling edge server of a network to a parent server that has the requested object. So, where the requested object is not available at the handling edge server, the client's request is redirected directly to the parent server that can provide the requested object to the client or indirectly via one or more parent servers to a parent server that can provide the requested object to the client. The method, system and computer program product further intelligently replicates the object to the edge server if the object is popular enough. Likewise, an object is removed from an edge server when it is no longer popular. All redirection and replication operations are preferably transparent to the end-user and do not degrade the quality of service.

4 Claims, 9 Drawing Sheets

(52) U.S. Cl.
CPC ...... *H04L 67/1002* (2013.01); *H04L 67/2852* (2013.01); *H04L 67/2885* (2013.01)

(56) References Cited

U.S. PATENT DOCUMENTS

| | | | |
|---|---|---|---|
| 4,594,704 A | 6/1986 | Ollivier | |
| 4,726,017 A | 2/1988 | Krum et al. | |
| 4,803,641 A | 2/1989 | Hardy et al. | |
| 4,839,798 A | 6/1989 | Eguchi et al. | |
| 4,847,784 A | 7/1989 | Clancey | |
| 4,920,432 A | 4/1990 | Eggers et al. | |
| 4,922,417 A | 5/1990 | Churm et al. | |
| 4,943,932 A | 7/1990 | Lark et al. | |
| 4,949,187 A | 8/1990 | Cohen | |
| 4,949,248 A | 8/1990 | Caro | |
| 5,029,232 A | 7/1991 | Nall | |
| 5,130,792 A | 7/1992 | Tindell et al. | |
| 5,132,992 A | 7/1992 | Yurt et al. | |
| 5,136,716 A | 8/1992 | Harvey et al. | |
| 5,172,413 A | 12/1992 | Bradley et al. | |
| 5,191,573 A | 3/1993 | Hair | |
| 5,253,275 A | 10/1993 | Yurt et al. | |
| 5,253,341 A | 10/1993 | Rozmanith et al. | |
| 5,287,499 A | 2/1994 | Nemes | |
| 5,287,537 A | 2/1994 | Newmark et al. | |
| 5,291,554 A | 3/1994 | Morales | |
| 5,341,477 A | 8/1994 | Pitkin et al. | |
| 5,371,532 A | 12/1994 | Gelman et al. | |
| 5,410,343 A | 4/1995 | Coddington et al. | |
| 5,414,455 A | 5/1995 | Hooper et al. | |
| 5,442,389 A | 8/1995 | Blahut et al. | |
| 5,442,390 A | 8/1995 | Hooper et al. | |
| 5,442,749 A | 8/1995 | Northcutt et al. | |
| 5,471,622 A | 11/1995 | Eadline | |
| 5,475,615 A | 12/1995 | Lin | |
| 5,508,732 A | 4/1996 | Bottomley et al. | |
| 5,515,511 A | 5/1996 | Nguyen et al. | |
| 5,519,435 A | 5/1996 | Anderson | |
| 5,528,281 A | 6/1996 | Grady et al. | |
| 5,539,621 A | 7/1996 | Kikinis | |
| 5,542,087 A | 7/1996 | Neimat et al. | |
| 5,544,313 A | 8/1996 | Shachnai et al. | |
| 5,544,327 A | 8/1996 | Dan et al. | |
| 5,550,577 A | 8/1996 | Verbiest et al. | |
| 5,550,863 A | 8/1996 | Yurt et al. | |
| 5,550,982 A | 8/1996 | Long et al. | |
| 5,557,317 A | 9/1996 | Nishio et al. | |
| 5,568,181 A | 10/1996 | Greenwood et al. | |
| 5,572,643 A | 11/1996 | Judson | |
| 5,590,288 A | 12/1996 | Castor et al. | |
| 5,592,611 A | 1/1997 | Midgely et al. | |
| 5,594,910 A | 1/1997 | Filepp et al. | |
| 5,603,026 A | 2/1997 | Demers et al. | |
| 5,614,940 A | 3/1997 | Cobbley et al. | |
| 5,619,648 A | 4/1997 | Canale et al. | |
| 5,623,656 A | 4/1997 | Lyons | |
| 5,625,781 A | 4/1997 | Cline et al. | |
| 5,627,829 A | 5/1997 | Gleeson et al. | |
| 5,630,067 A | 5/1997 | Kindell et al. | |
| 5,633,999 A | 5/1997 | Clowes et al. | |
| 5,634,006 A | 5/1997 | Baugher et al. | |
| 5,638,443 A | 6/1997 | Stefik et al. | |
| 5,644,714 A | 7/1997 | Kikinis | |
| 5,646,676 A | 7/1997 | Dewkett et al. | |
| 5,649,186 A | 7/1997 | Ferguson | |
| 5,659,729 A | 8/1997 | Nielsen | |
| 5,666,362 A | 9/1997 | Chen et al. | |
| 5,671,279 A | 9/1997 | Elgamal | |
| 5,675,734 A | 10/1997 | Hair | |
| 5,682,512 A | 10/1997 | Tetrick | |
| 5,699,513 A | 12/1997 | Feigen et al. | |
| 5,712,979 A | 1/1998 | Graber et al. | |
| 5,715,453 A | 2/1998 | Stewart | |
| 5,721,914 A | 2/1998 | DeVries | |
| 5,734,719 A | 3/1998 | Tsevdos et al. | |
| 5,734,831 A | 3/1998 | Sanders | |
| 5,740,423 A | 4/1998 | Logan et al. | |
| 5,742,762 A | 4/1998 | Scholl et al. | |
| 5,751,961 A | 5/1998 | Smyk | |
| 5,761,507 A | 6/1998 | Govett | |
| 5,761,663 A | 6/1998 | Lagarde et al. | |
| 5,764,906 A | 6/1998 | Edelstein et al. | |
| 5,774,660 A | 6/1998 | Brendel et al. | |
| 5,774,668 A | 6/1998 | Choquier et al. | |
| 5,777,988 A | 7/1998 | Cisneros | |
| 5,777,989 A | 7/1998 | McGarvey | |
| 5,778,187 A | 7/1998 | Monteiro et al. | |
| 5,781,909 A | 7/1998 | Logan et al. | |
| 5,784,058 A | 7/1998 | LaStrange et al. | |
| 5,796,952 A | 8/1998 | Davis et al. | |
| 5,799,141 A | 8/1998 | Galipeau et al. | |
| 5,802,106 A | 9/1998 | Packer | |
| 5,802,291 A | 9/1998 | Balick et al. | |
| 5,812,769 A | 9/1998 | Graber et al. | |
| 5,815,662 A | 9/1998 | Ong | |
| 5,815,664 A | 9/1998 | Asano | |
| 5,819,092 A | 10/1998 | Ferguson et al. | |
| 5,828,847 A | 10/1998 | Gehr et al. | |
| 5,832,069 A | 11/1998 | Waters et al. | |
| 5,832,506 A | 11/1998 | Kuzma | |
| 5,832,514 A | 11/1998 | Norin et al. | |
| 5,835,718 A | 11/1998 | Blewett | |
| 5,845,090 A | 12/1998 | Collins et al. | |
| 5,845,303 A | 12/1998 | Templeman | |
| 5,856,974 A | 1/1999 | Gervais et al. | |
| 5,862,339 A | 1/1999 | Bonnaure et al. | |
| 5,867,706 A | 2/1999 | Martin et al. | |
| 5,867,799 A | 2/1999 | Lang et al. | |
| 5,870,546 A | 2/1999 | Kirsch | |
| 5,870,559 A | 2/1999 | Leshem et al. | |
| 5,878,212 A | 3/1999 | Civanlar et al. | |
| 5,884,038 A | 3/1999 | Kapoor | |
| 5,890,171 A | 3/1999 | Blumer et al. | |
| 5,893,116 A | 4/1999 | Simmonds et al. | |
| 5,894,554 A | 4/1999 | Lowery et al. | |
| 5,896,533 A | 4/1999 | Ramos et al. | |
| 5,898,456 A | 4/1999 | Wahl | |
| 5,903,723 A | 5/1999 | Beck et al. | |
| 5,907,704 A | 5/1999 | Gudmundson et al. | |
| 5,913,028 A | 6/1999 | Wang et al. | |
| 5,913,033 A | 6/1999 | Grout | |
| 5,918,010 A | 6/1999 | Appleman et al. | |
| 5,919,247 A | 7/1999 | Van Hoff et al. | |
| 5,920,701 A | 7/1999 | Miller et al. | |
| 5,931,904 A | 8/1999 | Banga | |
| 5,933,832 A | 8/1999 | Suzuoka et al. | |
| 5,933,835 A | 8/1999 | Adams et al. | |
| 5,935,207 A | 8/1999 | Logue et al. | |
| 5,940,831 A | 8/1999 | Takano | |
| 5,944,780 A | 8/1999 | Chase | |
| 5,945,989 A | 8/1999 | Freishtat et al. | |
| 5,951,694 A | 9/1999 | Choquier et al. | |
| 5,956,489 A | 9/1999 | San Andres et al. | |
| 5,956,716 A * | 9/1999 | Kenner ............ G06F 17/30017 | |
| 5,958,008 A | 9/1999 | Pogrebisky et al. | |
| 5,961,596 A | 10/1999 | Takubo et al. | |
| 5,966,440 A | 10/1999 | Hair | |
| 5,968,121 A | 10/1999 | Logan et al. | |
| 5,973,696 A | 10/1999 | Agranat et al. | |
| 5,978,791 A | 11/1999 | Farber et al. | |
| 5,983,214 A | 11/1999 | Lang et al. | |
| 5,983,227 A | 11/1999 | Nazem et al. | |
| 5,987,606 A | 11/1999 | Cirasole et al. | |
| 5,991,809 A | 11/1999 | Kriegsman et al. | |
| 5,996,025 A | 11/1999 | Day | |
| 6,002,720 A | 12/1999 | Yurt et al. | |
| 6,003,030 A | 12/1999 | Kenner et al. | |
| 6,012,090 A | 1/2000 | Chung et al. | |
| 6,014,686 A | 1/2000 | Elnozahy et al. | |
| 6,014,698 A | 1/2000 | Griffiths | |
| 6,016,509 A | 1/2000 | Dedrick | |
| 6,016,512 A | 1/2000 | Huitema | |
| 6,018,516 A | 1/2000 | Packer | |
| 6,021,426 A | 2/2000 | Douglis | |

(56) References Cited

U.S. PATENT DOCUMENTS

| | | |
|---|---|---|
| 6,023,470 A | 2/2000 | Lee et al. |
| 6,026,440 A | 2/2000 | Shrader et al. |
| 6,029,175 A | 2/2000 | Chow et al. |
| 6,029,176 A | 2/2000 | Cannon |
| 6,035,332 A | 3/2000 | Ingrassia et al. |
| 6,038,216 A | 3/2000 | Packer |
| 6,038,310 A | 3/2000 | Hollywood et al. |
| 6,038,610 A | 3/2000 | Belfiore et al. |
| 6,041,324 A | 3/2000 | Earl et al. |
| 6,044,405 A | 3/2000 | Driscoll et al. |
| 6,046,980 A | 4/2000 | Packer |
| 6,049,831 A | 4/2000 | Gardell et al. |
| 6,052,718 A | 4/2000 | Gifford |
| 6,052,730 A | 4/2000 | Felciano et al. |
| 6,065,051 A | 5/2000 | Steele et al. |
| 6,065,062 A | 5/2000 | Periasamy et al. |
| 6,070,191 A | 5/2000 | Narendran et al. |
| 6,078,943 A | 6/2000 | Yu |
| 6,081,829 A | 6/2000 | Sidana |
| 6,081,835 A | 6/2000 | Antcliff |
| 6,081,840 A | 6/2000 | Zhao |
| 6,085,193 A | 7/2000 | Malkin et al. |
| 6,092,112 A | 7/2000 | Fukushige |
| 6,092,204 A | 7/2000 | Baker et al. |
| 6,094,706 A | 7/2000 | Factor et al. |
| 6,098,078 A | 8/2000 | Gehani |
| 6,098,096 A | 8/2000 | Tsirigotis et al. |
| 6,105,028 A | 8/2000 | Sullivan et al. |
| 6,108,673 A | 8/2000 | Brandt et al. |
| 6,108,703 A | 8/2000 | Leighton et al. |
| 6,112,231 A | 8/2000 | DeSimone et al. |
| 6,112,239 A | 8/2000 | Kenner et al. |
| 6,112,240 A | 8/2000 | Pogue et al. |
| 6,115,357 A | 9/2000 | Packer et al. |
| 6,115,752 A | 9/2000 | Chauhan |
| 6,119,143 A | 9/2000 | Dias et al. |
| 6,125,388 A | 9/2000 | Reisman |
| 6,125,394 A | 9/2000 | Rabinovich |
| 6,128,601 A | 10/2000 | Van Horne et al. |
| 6,128,623 A * | 10/2000 | Mattis ............... G06F 17/30902 707/695 |
| 6,128,660 A | 10/2000 | Grimm et al. |
| 6,130,890 A | 10/2000 | Leinwand et al. |
| 6,131,095 A | 10/2000 | Low et al. |
| 6,134,583 A | 10/2000 | Herriot |
| 6,144,375 A | 11/2000 | Jain et al. |
| 6,144,702 A | 11/2000 | Yurt et al. |
| 6,151,624 A | 11/2000 | Teare et al. |
| 6,154,744 A | 11/2000 | Kenner et al. |
| 6,154,753 A | 11/2000 | McFarland |
| 6,161,137 A | 12/2000 | Johnson et al. |
| 6,163,779 A | 12/2000 | Mantha et al. |
| 6,167,427 A | 12/2000 | Rabinovich et al. |
| 6,173,311 B1 | 1/2001 | Hassett et al. |
| 6,173,322 B1 | 1/2001 | Hu |
| 6,178,160 B1 | 1/2001 | Bolton et al. |
| 6,181,867 B1 | 1/2001 | Kenner et al. |
| 6,185,598 B1 | 2/2001 | Farber et al. |
| 6,185,619 B1 | 2/2001 | Joffe et al. |
| 6,189,030 B1 | 2/2001 | Kirsch et al. |
| 6,189,039 B1 | 2/2001 | Harvey |
| 6,195,680 B1 | 2/2001 | Goldszmidt et al. |
| 6,205,120 B1 | 3/2001 | Packer et al. |
| 6,212,565 B1 | 4/2001 | Gupta |
| 6,226,618 B1 | 5/2001 | Downs |
| 6,226,642 B1 | 5/2001 | Beranek et al. |
| 6,230,196 B1 | 5/2001 | Guenthner et al. |
| 6,233,623 B1 | 5/2001 | Jeffords et al. |
| 6,240,462 B1 | 5/2001 | Agraharam et al. |
| 6,243,760 B1 | 6/2001 | Armbruster et al. |
| 6,249,810 B1 | 6/2001 | Kiraly |
| 6,256,675 B1 | 7/2001 | Rabinovich |
| 6,263,313 B1 | 7/2001 | Milsted |
| 6,266,335 B1 | 7/2001 | Bhaskaran |
| 6,266,699 B1 | 7/2001 | Sevcik |
| 6,269,394 B1 | 7/2001 | Kenner et al. |
| 6,272,566 B1 | 8/2001 | Craft |
| 6,275,470 B1 | 8/2001 | Ricciulli |
| 6,282,569 B1 | 8/2001 | Wallis et al. |
| 6,286,045 B1 | 9/2001 | Griffith et al. |
| 6,298,041 B1 | 10/2001 | Packer |
| 6,314,565 B1 | 11/2001 | Kenner et al. |
| 6,317,787 B1 | 11/2001 | Boyd et al. |
| 6,324,580 B1 | 11/2001 | Jindal et al. |
| 6,324,582 B1 | 11/2001 | Sridhar et al. |
| 6,330,602 B1 | 12/2001 | Law et al. |
| 6,332,157 B1 | 12/2001 | Mighdoll et al. |
| 6,338,044 B1 | 1/2002 | Cook et al. |
| 6,343,298 B1 | 1/2002 | Savchenko et al. |
| 6,345,294 B1 | 2/2002 | O'Toole et al. |
| 6,347,085 B2 | 2/2002 | Kelly et al. |
| 6,351,775 B1 | 2/2002 | Yu |
| 6,351,776 B1 | 2/2002 | O'Brien et al. |
| 6,360,256 B1 | 3/2002 | Lim |
| 6,370,571 B1 | 4/2002 | Medin |
| 6,370,580 B2 | 4/2002 | Kriegsman |
| 6,389,462 B1 | 5/2002 | Cohen et al. |
| 6,398,245 B1 | 6/2002 | Gruse |
| 6,405,252 B1 | 6/2002 | Gupta et al. |
| 6,405,257 B1 | 6/2002 | Gersht et al. |
| 6,412,000 B1 | 6/2002 | Riddle et al. |
| 6,415,280 B1 | 7/2002 | Farber et al. |
| 6,415,368 B1 | 7/2002 | Glance et al. |
| 6,418,421 B1 | 7/2002 | Hurtado |
| 6,421,714 B1 | 7/2002 | Rai et al. |
| 6,421,726 B1 | 7/2002 | Kenner et al. |
| 6,427,170 B1 | 7/2002 | Sitaraman et al. |
| 6,430,618 B1 | 8/2002 | Karger et al. |
| 6,442,588 B1 | 8/2002 | Clark et al. |
| 6,453,319 B1 * | 9/2002 | Mattis ............... G06F 17/30902 |
| 6,456,630 B1 | 9/2002 | Packer et al. |
| 6,460,082 B1 | 10/2002 | Lumelsky |
| 6,460,085 B1 | 10/2002 | Toporek et al. |
| 6,463,454 B1 | 10/2002 | Lumelsky et al. |
| 6,463,508 B1 | 10/2002 | Wolf |
| 6,466,949 B2 | 10/2002 | Yang et al. |
| 6,470,389 B1 | 10/2002 | Chung et al. |
| 6,473,405 B2 | 10/2002 | Ricciulli |
| 6,477,180 B1 * | 11/2002 | Aggarwal ............... G06Q 30/06 348/E7.071 |
| 6,480,893 B2 | 11/2002 | Kriegsman |
| 6,484,143 B1 | 11/2002 | Swildens et al. |
| 6,484,204 B1 | 11/2002 | Rabinovich |
| 6,487,555 B1 | 11/2002 | Bharat et al. |
| 6,490,580 B1 | 12/2002 | Dey et al. |
| 6,493,707 B1 | 12/2002 | Dey et al. |
| 6,496,856 B1 | 12/2002 | Kenner et al. |
| 6,502,125 B1 | 12/2002 | Kenner et al. |
| 6,502,205 B1 | 12/2002 | Yanai et al. |
| 6,502,215 B2 | 12/2002 | Raad et al. |
| 6,505,248 B1 | 1/2003 | Casper et al. |
| 6,529,477 B1 | 3/2003 | Toporek et al. |
| 6,553,413 B1 | 4/2003 | Leighton et al. |
| 6,553,420 B1 | 4/2003 | Karger et al. |
| 6,557,054 B2 | 4/2003 | Reisman |
| 6,564,251 B2 | 5/2003 | Katariya et al. |
| 6,577,595 B1 | 6/2003 | Counterman |
| 6,581,090 B1 | 6/2003 | Lindbo et al. |
| 6,584,083 B1 | 6/2003 | Toporek et al. |
| 6,587,837 B1 | 7/2003 | Spagna |
| 6,591,288 B1 | 7/2003 | Edwards et al. |
| 6,591,299 B2 | 7/2003 | Riddle et al. |
| 6,594,260 B1 | 7/2003 | Aviani, Jr. et al. |
| 6,598,121 B2 | 7/2003 | Challenger et al. |
| 6,611,862 B2 | 8/2003 | Reisman |
| 6,625,643 B1 | 9/2003 | Colby et al. |
| 6,651,141 B2 | 11/2003 | Adrangi |
| 6,654,344 B1 | 11/2003 | Toporek et al. |
| 6,654,807 B2 | 11/2003 | Farber et al. |
| 6,658,464 B2 | 12/2003 | Reisman |
| 6,665,706 B2 | 12/2003 | Kenner et al. |
| 6,665,726 B1 | 12/2003 | Leighton et al. |
| 6,678,659 B1 | 1/2004 | Van Kommer |
| 6,691,148 B1 | 2/2004 | Zinky et al. |

(56) References Cited

U.S. PATENT DOCUMENTS

| | | |
|---|---|---|
| 6,694,358 B1 | 2/2004 | Swildens et al. |
| 6,699,418 B2 | 3/2004 | Okada et al. |
| 6,708,137 B2 | 3/2004 | Carley |
| 6,718,328 B1 | 4/2004 | Norris |
| 6,732,237 B1 | 5/2004 | Jacobs et al. |
| 6,741,563 B2 | 5/2004 | Packer |
| 6,741,990 B2 | 5/2004 | Nair et al. |
| 6,751,673 B2 | 6/2004 | Shaw |
| 6,754,699 B2 | 6/2004 | Swildens et al. |
| 6,754,706 B1 | 6/2004 | Swildens et al. |
| 6,763,377 B1 | 7/2004 | Belknap |
| 6,763,388 B1 | 7/2004 | Tsimelzon |
| 6,778,502 B2 | 8/2004 | Ricciulli |
| 6,785,704 B1 | 8/2004 | McCanne |
| 6,799,221 B1 | 9/2004 | Kenner et al. |
| 6,801,576 B1 | 10/2004 | Haldeman et al. |
| 6,834,306 B1 | 12/2004 | Tsimelzon |
| 6,839,758 B2 | 1/2005 | Sorensen |
| 6,842,604 B1 | 1/2005 | Cook et al. |
| 6,859,791 B1 | 2/2005 | Spagna |
| 6,859,840 B2 | 2/2005 | Singal et al. |
| 6,870,851 B1 | 3/2005 | Leinwand et al. |
| 6,874,032 B2 | 3/2005 | Gersht et al. |
| 6,901,604 B1 | 5/2005 | Kiraly |
| 6,915,307 B1* | 7/2005 | Mattis ............... G06F 17/30067 |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,963,910 B1 | 11/2005 | Belknap et al. |
| 6,963,980 B1 | 11/2005 | Mattsson |
| 6,963,981 B1 | 11/2005 | Bailey et al. |
| 6,965,890 B1 | 11/2005 | Dey et al. |
| 6,970,432 B1 | 11/2005 | Hankins et al. |
| 6,973,490 B1 | 12/2005 | Robertson et al. |
| 6,976,090 B2 | 12/2005 | Ben-Shaul et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 6,999,988 B2 | 2/2006 | Buddhikot et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,013,342 B2 | 3/2006 | Riddle |
| 7,024,466 B2 | 4/2006 | Outten et al. |
| 7,032,072 B1 | 4/2006 | Quinn et al. |
| 7,039,633 B1 | 5/2006 | Dey et al. |
| 7,047,300 B1 | 5/2006 | Oehrke et al. |
| 7,054,902 B2 | 5/2006 | Toporek et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,564 B1 | 9/2006 | Ehnebuske |
| 7,103,645 B2 | 9/2006 | Leighton et al. |
| 7,110,984 B1 | 9/2006 | Spagna |
| 7,117,259 B1 | 10/2006 | Rohwer |
| 7,188,085 B2 | 3/2007 | Pelletier |
| 7,206,748 B1 | 4/2007 | Gruse |
| 7,254,645 B2 | 8/2007 | Nishi |
| 7,562,153 B2 | 7/2009 | Biliris et al. |
| 2001/0027491 A1 | 10/2001 | Terretta |
| 2001/0029525 A1 | 10/2001 | Lahr |
| 2001/0049732 A1 | 12/2001 | Raciborski et al. |
| 2001/0051980 A1 | 12/2001 | Raciborski et al. |
| 2001/0056500 A1 | 12/2001 | Farber et al. |
| 2002/0010798 A1 | 1/2002 | Ben-Shaul et al. |
| 2002/0016831 A1 | 2/2002 | Peled et al. |
| 2002/0016835 A1 | 2/2002 | Gamerman |
| 2002/0018449 A1 | 2/2002 | Ricciulli |
| 2002/0023164 A1 | 2/2002 | Lahr |
| 2002/0023165 A1 | 2/2002 | Lahr |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0066038 A1 | 5/2002 | Mattsson |
| 2002/0073167 A1* | 6/2002 | Powell ............... H04L 12/5692 709/217 |
| 2002/0073199 A1 | 6/2002 | Levine et al. |
| 2002/0078233 A1 | 6/2002 | Biliris et al. |
| 2002/0082999 A1 | 6/2002 | Lee et al. |
| 2002/0083124 A1 | 6/2002 | Knox et al. |
| 2002/0087797 A1 | 7/2002 | Adrangi |
| 2002/0089470 A1 | 7/2002 | Raman et al. |
| 2002/0092026 A1 | 7/2002 | Janniello et al. |
| 2002/0099850 A1 | 7/2002 | Farber et al. |
| 2002/0116444 A1 | 8/2002 | Chaudhri et al. |
| 2002/0124080 A1 | 9/2002 | Leighton |
| 2002/0129134 A1 | 9/2002 | Leighton et al. |
| 2002/0131645 A1 | 9/2002 | Hamilton |
| 2002/0133537 A1 | 9/2002 | Lau |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0152318 A1 | 10/2002 | Menon et al. |
| 2002/0163882 A1 | 11/2002 | Bornstein et al. |
| 2002/0198953 A1 | 12/2002 | O'Rourke et al. |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0031176 A1 | 2/2003 | Sim |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0065703 A1 | 4/2003 | Aborn |
| 2003/0065762 A1 | 4/2003 | Stolorz et al. |
| 2003/0078888 A1 | 4/2003 | Lee et al. |
| 2003/0078889 A1 | 4/2003 | Lee et al. |
| 2003/0079027 A1 | 4/2003 | Slocombe et al. |
| 2003/0095660 A1 | 5/2003 | Lee et al. |
| 2003/0105604 A1 | 6/2003 | Ash et al. |
| 2003/0112792 A1 | 6/2003 | Cranor et al. |
| 2003/0149581 A1 | 8/2003 | Chaudhri et al. |
| 2003/0154239 A1 | 8/2003 | Davis et al. |
| 2003/0158923 A1 | 8/2003 | Burkhart |
| 2003/0158928 A1 | 8/2003 | Knox et al. |
| 2004/0022194 A1 | 2/2004 | Ricciulli |
| 2004/0139097 A1 | 7/2004 | Farber et al. |
| 2004/0177148 A1 | 9/2004 | Tsimelzon, Jr. |
| 2005/0021863 A1 | 1/2005 | Jungck |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0015574 A1 | 1/2006 | Seed et al. |
| 2006/0143293 A1 | 6/2006 | Freedman |
| 2007/0055764 A1 | 3/2007 | Dilley et al. |
| 2007/0174463 A1 | 7/2007 | Seed et al. |
| 2008/0065724 A1 | 3/2008 | Seed et al. |
| 2008/0071859 A1 | 3/2008 | Seed et al. |
| 2009/0254661 A1 | 10/2009 | Fullagar et al. |
| 2010/0312861 A1 | 12/2010 | Kolhi et al. |
| 2010/0332595 A1 | 12/2010 | Fullagar et al. |

FOREIGN PATENT DOCUMENTS

| | | |
|---|---|---|
| CA | 2288488 | 6/2000 |
| CA | 2335661 | 3/2001 |
| CA | 2335662 | 3/2001 |
| CA | 2467998 | 4/2006 |
| CN | ZL99810853.7 | 8/1999 |
| CN | 1264476 A | 8/2000 |
| EP | 0649121 | 4/1995 |
| EP | 0651554 | 5/1995 |
| EP | 0801487 A2 | 10/1997 |
| EP | 0817444 A2 | 1/1998 |

(56) References Cited

FOREIGN PATENT DOCUMENTS

| | | |
|---|---|---|
| EP | 0824236 A2 | 2/1998 |
| EP | 0865180 A2 | 9/1998 |
| EP | 1063831 A2 | 12/2000 |
| EP | 1104555 | 6/2001 |
| GB | 2281793 A1 | 3/1995 |
| GB | 2353877 | 4/2004 |
| IL | 140935 | 3/2006 |
| JP | 05162529 | 6/1993 |
| JP | 07066829 | 3/1995 |
| JP | 08328583 | 12/1996 |
| JP | 10027148 A2 | 1/1998 |
| JP | 10093552 | 4/1998 |
| JP | 2000207270 | 7/2000 |
| JP | 2001007844 | 1/2001 |
| JP | 2001290787 | 10/2001 |
| JP | 2001312434 | 11/2001 |
| JP | 2002522995 | 7/2002 |
| JP | 3566626 | 6/2004 |
| JP | 2005124165 | 5/2005 |
| JP | 3762649 | 1/2006 |
| KR | 20010023599 | 3/2001 |
| TW | NI176482 | 8/2003 |
| WO | WO-1996/042041 A2 | 12/1996 |
| WO | WO-1997/011429 A1 | 3/1997 |
| WO | WO-1997/029423 A1 | 8/1997 |
| WO | WO-199742582 | 11/1997 |
| WO | WO-1998/004985 A1 | 2/1998 |
| WO | WO-1998/006033 A1 | 2/1998 |
| WO | WO-199859486 | 12/1998 |
| WO | WO-199917227 | 4/1999 |
| WO | WO-199948246 | 9/1999 |
| WO | WO-199953422 | 10/1999 |
| WO | WO-2000/029990 A1 | 5/2000 |
| WO | WO-2000060861 | 10/2000 |
| WO | WO-200193533 | 12/2001 |

OTHER PUBLICATIONS

European Exam Report, dated Apr. 29, 2011, EP App. No. 03739748.6, 5 pgs.
European Examination Report, dated Nov. 28, 201, Application No. 03739748.6, 6 pgs.
"Exporting Web Server Final Report", http://www.cs.technion.ac.il/Labs/Lccn/projects/spring97/project4/final_report.html (downloaded Jul. 7, 2007). Spring 1997.
"IBM Technical Disclosure Bulletin; Local Area Network Server Replacement Procedure", vol. 38, No. 1 (Jan. 1995) , 235-236.
JP 10(1998)—27148 machine translation prepared by Japanese Patent Office (JPO), published Jan. 27, 1998, Title: "Server System for Internet," Applicant: Hitachi , 23 pgs.
Non-Final Office Action, dated Jun. 11, 2013, U.S. Appl. No. 12/880,324, filed Sep. 13, 2010; 17 pgs.
Patent Abstracts of Japan "Server System for Internet", Pub. No. 10-027148, pub. date Jan. 27, 1998, Applicant: Hitachi, computer translation , 12 pgs.
Patent Abstracts of Japan, "Electronic Mail Multiplexing System and Communication Control Method in the System", (Appln. No. JP19930162529), (Jun. 30, 1993) (Pub. No. JP 7066829).
Patent Abstracts of Japan, "Method and Device for Repeating and Converting Information", (Appln. No. JP19960328583) (Pub. No. JP10171727) Jun. 26, 1998.
Summons to Attend Oral Proceedings, dated Jun. 28, 2013, EP Application No. 03739748.6, 6 pgs.
Adler, R. M., "Distributed Coordination Models for Client/Server Computing", Computer 28, Apr. 4, 1995 , 14-22.
Aggarwal, A. et al., "Performance of Dynamic Replication Schemes for an Internet Hosting Service", Technical Report, AT&T Labs Oct. 1998.
Almeroth, K. et al., "Scalable Delivery of Web Pages Using Cyclic Best-Effort (UDP) Multicast", *IEEE Infocom* San Francisco, California, USA Jun. 1998 , pp. 1-24.

Andresen, D. et al., "Multiprocessor scheduling with client resources to improve the response time of WWW applications", *ACM Press, NY,* Proc. 11th Inti Conf. on Supercomputing (Austria, ICS '97) Jul. 1997 , 92-99.
Andresen, et al., "SWEB: Towards a Scalable World Wide Web Server on Multicomputers", Proc. IPPS Apr. 15, 1996 , 850-856.
Awerbuch, et al., "Competitive Distributed File Allocation", in Proc. of the 25th Ann. ACM Symp. on Theory of Computing May 1993 , pp. 164-173.
Awerbuch, B. et al., "Distributed Paging for General Networks", In Proc. of the 7th ACM-SIAM Symposium on Discrete Algorithms, Jan. 1996 , pp. 574-583.
Baentsch, M et al., "Enhancing the Web's Infrastructure: From Caching to Replication", IEEE Internet Computing, Mar. 1997 , 1(2):18-27.
Baentsch, M. et al., "Introducing Application-Level Replication and Naming into Today's Web", *Computer Networks and ISDN Systems* vol. 28, Nos. 7-11 May 1996 , pp. 921-930.
Bartal, Y. et al., "Competitive Algorithms for Distributed Data Management", 24th Annual ACM STOC, May 1992, Victoria, B.C. Canada.
Basturk, E. et al., "Using network layer anycast for load distribution in the Internet", Tech. Rep., IBM TJ. Watson Research Center Jul. 1997 , 21 pgs.
Berners-Lee, T. et al., RFC 1738—Uniform Resource Locators Dec. 1994 , pp. 1-25.
Berners-Lee, T. et al., "Hypertext Markup Language—2.0", Internet Engineering Task Force (IETF) Request for Comments (RFC) 1866 Nov. 1995 , pp. 1-77.
Berners-Lee, T. et al., "Hypertext Transfer Protocol—HTTP/1.0", Internet Engineering Task Force (IETF) Request for Comments (RFC) 1945 May 1996 , pp. 1-60.
Berners-Lee, T. et al., "Hypertext Transfer Protocol—HTTP/1.0", Internet Engineering Task Force (IETF), Internet Draft, draft-ietf-http-v10-spec-00.ps Mar. 1995 , pp. 1-59.
Berra, P. B. et al., "Architecture for Distributed Database Systems", *Computer Communications* vol. 13, No. 4 May 1, 1990 , pp. 217-231.
Bestavros, A., "Demand-Based Document Dissemination to Reduce Traffic and Balance Load in Distributed Information Systems", In Proc. IEEE Symp. on Parallel and Distributed Processing, San Antonio, TX Oct. 1995 , 8 pgs.
Bestavros, et al., "Server-Initiated Document Dissemination for the WWW", IEEE Data Engineering Bulletin Sep. 1996 , 19(3): 3-11.
Bestavros, A., "Speculative Data Dissemination and Service to Reduce Server Load Network Traffic and Service Time in Distributed Information Systems", In Proc. ICDE '96: The 1996 Int'l Conf. on Data Engineering (Mar. 1996) , 4 Pages.
Bhattacharjee, S. et al., "Application-Layer Anycasting", *in Proc. IEEE INFOCOM '97* Apr. 1997 , 9 pgs.
Braun, H. et al., "Web traffic characterization: an assessment of the impact of caching documents from NCSA's web server", Comput. Netw. ISDN Syst. 28, Dec. 1-2, 1995 , 37-51.
Brisco, T., "DNS Support for Load Balancing", IETF RFC 1794 Apr. 1995 , pp. 1-7.
Carter, et al., "Dynamic server selection using bandwidth probing in wide-area networks", Tech. Rep. BU-CS-96-007, Compo Sci. Dept., Boston University Mar. 1996 , 1-20.
Carter, et al., "Server selection using dynamic path characterization in Wide-Area Networks", IEEE INFOCOM '97 1997 , pp. 1014-1021.
Carter, J. L. et al., "Universal Classes of Hash Functions", *Journal of Computer and System Sciences* vol. 18, No. 2 Apr. 1979, 106-112.
Cate, V., "Alex: a global file system", in Proc. Usenix Conf. on File Systems May 1992 , pp. 1-11.
Chankhunthod, A. et al., "A Hierarchical Internet Object Cache", *Proc. of the 1996 USENIX Technical Conf.* Jan. 1996 , 153-163.
Cohen, J. et al., "Cache Array Routing Protocol v1.1", http://tools.ietf.org/id/draft-vinod-carp-v1-01.txt (Last-Modified: Wed, Oct 1, 1997) Sep. 29, 1997 , 8 pages.
Colajanni, et al., "Adaptive TTL schemes for load balancing of distributed Web servers", SIGMETRICS Perform. Eval. Rev. 25,Sep. 2, 1997 , 36-42.

(56) References Cited

OTHER PUBLICATIONS

Colajanni, M. et al., "Scheduling Algorithms for Distributed Web Servers", Intl Conf. on Distributed Computing Systems (ICDCS), Baltimore, Maryland, USA May 1997, pp. 169-176.
Crovella, et al., "Dynamic server selection in the Internet", 3rd IEEE Workshop on the Arch. and Implementation of High Performance Computer Sys. '95 Aug. 1995, pp. 158-162.
Danzig, P. B. et al., "An analysis of wide-area name server traffic: a study of the Internet Domain Name System", Conf. Proc. Communications Architectures & Protocols; D. Oran, Ed. SIGCOMM '92; ACM Press, New York, NY Aug. 1992, 281-292.
De Bra, P.M.E. et al., "Information Retrieval in the World Wide Web: Making Client-Based Searching Feasible", Computer Networks and ISDN System, NL, North Holland Publishing, Amsterdam, vol. 27, No. 2, ISSN: 0169-7552 Nov. 1, 1994, 183-192.
Deering, S. E. et al., "Multicast routing in datagram internetworks and extended LANs", ACM Trans.Comput. Syst. 8,May 2, 1990, 85-110.
Doi, K., "Super Proxy Script—How to make distributed proxy servers by URL hashing", Sharp Corp., http://naragw.sharp.co.jp/sps/; download Jul. 7, 2007. dates unknown (1996-2000).
Eriksson, H., "MBONE: The Multicast Backbone", *Communications of the ACM* vol. 37, No. 8 Aug. 1994, pp. 54-60.
Feeley, M. et al., "Implementing Global Memory Management in a Workstation Cluster", In Proc. 15th ACM Symp. on Operating Systems Principles Dec. 1995, 201-212.
Fielding, R. et al., "Hypertext Transfer Protocol—HTTP/1.1", Internet Engineering Task Force (IETF) Internet Draft, draft-ietf-http-v11-spec-00.txt Nov. 1995, pp. 1-81.
Fielding, R. et al., "Hypertext Transfer Protocol—HTTP/1.1", Internet Engineering Task Force (IETF) Request for Comments (RFC) 2068 Jan. 1997, pp. 1-162.
Floyd, S. et al., "A Reliable Multicast Framework for Light-Weight Sessions and Application Level Framing", In Proc. of ACM SIGCOMM '95, Aug. 1995, 342-356.
Fox, A. et al., "A Framework for Separating Server Scalability and Availability from Internet Application Functionality", PhD thesis, University of California, Berkeley, 1998, 163 pgs.
Fox, A. et al., "Cluster-based scalable network services", Proc. 16th ACM Symp. on Operating Systems Principles (Saint Malo, France, Oct. 5-8, 1997), W. M. Waite, Ed. SOSP '97. ACM Press, New York, NY, 78-91.
Gadde, S. et al., "Reduce, reuse, recycle: An approach to building large internet caches", in Workshop on Hot Topics in Operating Systems (HotOS) Apr. 1997, pp. 93-98.
Goldszmidt, M. et al., "Load Distribution for Scalable Web Servers: Summer Olympics 1996—A Case Study", In Proc. 8th IFIPIIEEE Int'l Workshop on Distributed Systems: Operations and Management, Sydney, Australia. Oct. 1997, 10 pgs.
Grigni, M. et al., "Tight Bounds on Minimum Broadcasts Networks", SIAM J. Disc. Math. 4 (May 1991), 207-222.
Guyton, et al., "Locating nearby copies of replicated Internet servers", Proc. ACM SIGCOMM '95; pp. 288-298 Oct. 1995.
Gwertzman, J. et al., "The Case for Geographical Push-Caching", Proc. Workshop on Hot OS '95 (May 4, 1995), 51-55.
Gwertzman, J. et al., "World-Wide Web Cache Consistency", Proc. 1996 USENIX Tech. Conf., pp. 141-151, San Diego, CA Jan. 1996.
Jeffery, C. et al., "Proxy sharing proxy servers", In Proc. IEEE etaCOM Conf. May 1996, pp. 116-119.
Karger, D. et al., "Consistent Hashing and Random Trees: Distributed Caching Protocols for Relieving Hot Spots on the World Wide Web", In Proc. 29th Annual ACM Symp. on Theory of Computing May 1997, 654-663.
Kim, Y. J. et al., "Clustered multi-media NOD: Popularity-based article prefetching and placement", Sixteenth IEEE Symp. on Mass Storage Systems, San Diego, CA (Mar. 15-18, 1999, pp. 194-202.
Korkea-Aho, M., "Scalability in Distributed Multimedia Systems", Technical report TKO-B128, Helsinki University of Technology.

Krishnamurthy, B. et al., "Study of piggyback cache validation for proxy caches in the World Wide Web", in: Symp. on Internet Technology and Systems, USENIX Association Dec. 1997.
Kroeger, T. M. et al., "Exploring the Bounds of Web Latency Reduction from Caching and Prefetching", Proc. Usenix Symp. Internet Technologies and Systems, Usenix Dec. 1997, pp. 13-22.
Kwan, et al., "NCSA's World Wide Web Server: Design and Performance", IEEE Nov. 1995, pp. 68-74.
Little, T.D. C. et al., "Selection and Dissemination of Digital Video via the Virtual Video Browser", *Multimedia Tools and Applications* vol. 1, No. 2 (Netherlands) Jun. 1995, 99. 149-172.
Luotonen, et al., "World-Wide Web Proxies", *CERN* modified May 24, 1994 Apr. 1994, 1-8.
Malkin, G., "RIP Version 2 Carrying Additional Information", Internet Engineering Task Force (IETF) Request for Comments (RFC) 1388 Jan. 1993, pp. 1-7.
Malpani, R. et al., "Making World Wide Web Caching Servers Cooperate", In Proc. 4th Int'l World Wide Web Conf. (downloaded from http://www.w3.org/ConferencesIWWW4/Papers/59/ on Jul. 7, 2007) Dec. 1995, 10 pages.
Mockapetris, P., "Domain Names—Concepts and Facilities", IETF RFC 1034 Nov. 1987, 55 pgs.
Mockapetris, P., "Domain Names—Implementation and Specification", IETF RFC 1035 Nov. 1987, 55 pgs.
Mourad, et al., "Scalable Web Server Architectures", iscc, 2nd IEEE Symposium on Computers and Communications (ISCC '97) Jul. 1997, pp. 12-16.
Moy, J., "OSPF Version 2", Internet Engineering Task Force (IETF) Request for Comments (RFC) 1583 Mar. 1994, 132 pgs.
Niki, Hitoshi, "Storage Network", *Computopia* vol. 36, No. 415, Japan, Computer Age Co., Ltd. (translation) Apr. 1, 2001, p. 52.
Oguchi, et al., "A Study of Caching Proxy Mechanisms Realized on Wide Area Distributed Networks", High Performance Distributed Computing, 5th Int'l Symposium Aug. 1996, pp. 443-449.
Palmer, M. et al., "Fido: A Cache that Learns to Fetch", In Proc. the 17th Int'l Conf. on Very Large Data Bases Sep. 1991, 255-264.
Panigrahy, R., "Relieving Hot Spots on the World Wide Web", Master's thesis, MIT EECS Jun. 1997, pp. 1-66.
Parris, C. et al., "A Dynamic Connection Management Scheme for Guaranteed Performance Services in Packet-Switching Integrated Services Networks", UC Berkeley Computer Science Division Tech. Report TR-93-005 1993, 37 pgs.
Parris, C. et al., "The Dynamic Management of Guaranteed Performance Connections in Packet Switched Integrated Service Networks", UC Berkeley Computer Science Division and International Computer Science Institute Tech. Report CSD-94-859 1994.
Partridge, C. et al., "Host Anycasting Service", Internet Engineering Task Force (IETF) Request for Comments (RFC) 1546 Nov. 1993, pp. 1-9.
Petri, S. et al., "Load Balancing and Fault Tolerance in Workstation Clusters. Migrating Groups of Communicating Processes", Operating Systems Review, vol. 29, No. 4 Oct. 1995, 25-36.
Plaxton, G. C. et al., "Fast Fault-Tolerant Concurrent Access to Shared Objects", In Proc. 37th IEEE Symp. of Foundations of Computer Science Oct. 1996, pp. 570-579.
Povey, D. et al., "A distributed internet cache", in Proc. of the 20th Australasian Computer Science Conf. Feb. 1997.
Rabin, M. O., "Efficient dispersal of information for security, load balancing, and fault tolerance", *J.ACM* 36, 2 (Apr. 1989), pp. 335-348.
Rabinovich, M. et al., "Dynamic Replication on the Internet Work Project No. 3116-17-7006", AT&T Labs Research Mar. 5, 1998.
Rabinovich, M. et al., "RaDaR: A Scalable Architecture for a Global Web Hosting Service", WWW8 May 1999.
Reisslein, M. et al., "Interactive video streaming with proxy servers", in Proc. of First International Workshop on Intelligent Multimedia Computing and Networking (IMMCN) 2000, pp. 1-16.
Rodriguez, P. et al., "Improving the WWW: Caching or Multicast?", *Computer Networks and ISDN Systems* North Holland Publishing, Amsterdam, NL, vol. 30, No. 22-23, ISSN: 0169-7552 Nov. 1998, pp. 2223-2243.

(56) References Cited

OTHER PUBLICATIONS

Ross, K. W., "Hash-Routing for Collections of Shared Web Caches", *IEEE Network Magazine* 11, 7:37-44 Nov.-Dec. 1997, pp. 1-21.

Sen, S. et al., "Proxy Prefix Caching for Multimedia Streams", *IEEE* Jun. 1999, 10 pgs.

Smith, Neil, "What can Archives offer the World Wide Web?", Technical Report 11, University of Kent, Computing Laboratory, University of Kent, Canterbury, UK Mar. 1994, 1-12.

Takahashi, Takao, "How to customize Apache Q&A—Web server using Apache", AI Publishing, Apr. 30, 1999, First Edition, pp. 63-64 (translation).

Thaler, D. G. et al., "Using name-based mappings to increase hit rates", IEEE/ACM Trans. Netw. 6, Feb. 1, 1998, 1-14.

Topolcic, C., "Experimental Internet Stream Protocol, Version 2 (ST-II)", Internet Engineering Task Force (IETF) Request for Comments (RFC) 1190 Oct. 1990, pp. 1-148.

Touch, J. et al., "The X-Bone", Third Global Internet Mini-Conference at Globecom '98, Sydney, Australia (pp. 44-52 of mini-conference) Nov. 1998, pp. 59-68.

Traina, P., "BGP-4 Protocol Analysis", Internet Engineering Task Force (IETF) Request for Comments (RFC) 1774 Mar. 1995, pp. 1-10.

Vin, H., "Multimedia Broadcasting Over the Internet: Part 1", *IEEE Multimedia* IEEE Computer Society, US, vol. 5, NR. Oct. 4, 1998, pp. 78-82.

Vitter, J. S. et al., "Optimal Prefetching via Data Compression", Proc. 32nd Annual IEEE Symposium on Foundations of Computer Science Oct. 1991, 21 pages.

Wessels, D., "Configuring Hierarchical Squid Caches", Aug. 19, 1997, 62 pgs.

Wessels, Duane, "Intelligent Caching for World-Wide Web Objects", Masters Thesis, University of Colorado (also presented at INET '95 in Jun. '95) Jan. 1995, 1-85.

Wessels, D. et al., "Internet Cache Protocol (ICP), Version 2", Internet Engineering Task Force (IETF) Request for Comments (RFC) 2186 Sep. 1997, pp. 1-9.

Wolfson, O. et al., "An Adaptive Data Replication Algorith", ACM Transactions on Database Systems (TODS) vol. 22(4) Jun. 1997, pp. 255-314.

Xiao, Li et al., "Exploiting neglected data locality in browsers", in Proc. 10th Int'l World Wide Web Conference, (WWW10), Hong Kong (extended abstract) May 1-5, 2001, 2 pgs.

\* cited by examiner

MANAGED OBJECT REPLICATION AND DELIVERY

CROSS-REFERENCE AND BACKGROUND

The present application is a continuation application claiming priority under 35 U.S.C. Section 120 to utility U.S. patent application Ser. No. 10/073,938, now U.S. Pat. No. 9,167,036, which is hereby incorporated by reference in its entirety. This invention relates in general to the field of computer networks. Particularly, aspects of this invention pertain to managed object replication and delivery over a network.

BRIEF DESCRIPTION OF THE DRAWINGS

Exemplary embodiments of the invention are illustrated in the accompanying drawings in which like references indicate similar or corresponding elements and in which.

DETAILED DESCRIPTION

Figure 1:
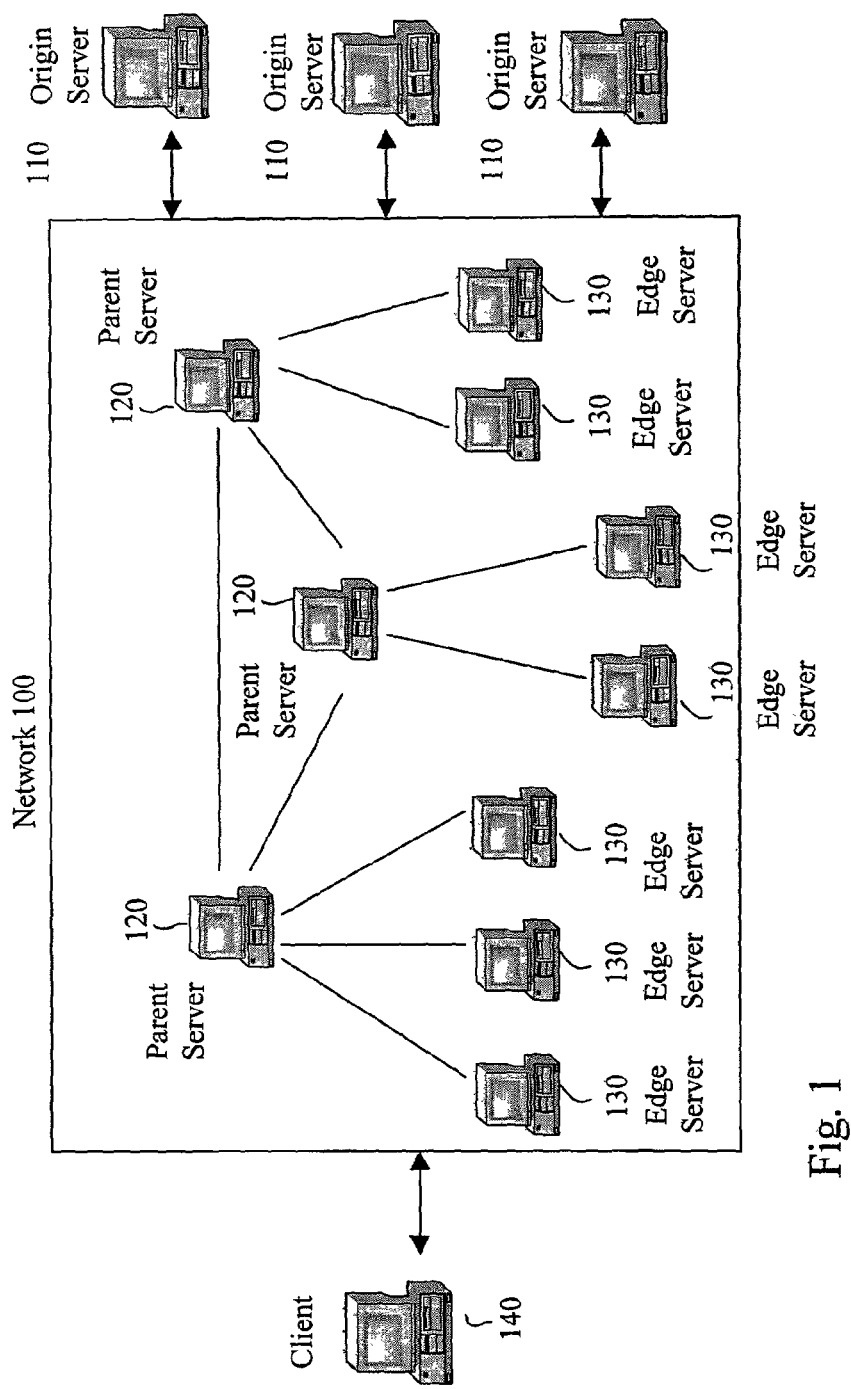
FIG. 1 is a high-level block diagram of a topology of the managed object replication and delivery method and system according to embodiments of the invention.

A typical content delivery network (CDN) operator deploys one or more parent servers, hosting a plurality of objects, in a network and one or more edge servers at the edge of the network to facilitate more cost-effective and efficient delivery of such objects to an end-user (client). End-users or client proxies that access customers' objects are called clients. Content provider companies, organizations, etc. that subscribe to the CDN service are referred to as customers. As used herein, an object includes, without limitation, an audio file (such as, e.g., an MP3 (Motion Picture Experts Group-1 Layer 3) file and a RealNetworks, Inc. Real format file), a video file (such as an MPEG file), an image file (such as, e.g., a BMP (bitmap) file or JPEG (Joint Photographic Experts) file) and any other software or data file or object. It is typically desirable to serve objects from edge servers because the edge servers are typically closer (by various measures of distance) to end-users. For example, streaming content data from edge servers saves parent-to-edge bandwidth. Furthermore, the less the distance objects must travel can also mean reduced network congestion and packet losses, which can lead to a better experience for the end-user through faster response times and better quality of service.

It is typically not feasible to store all objects on the edge servers. The main difficulty is due to the fact that many such objects are very large (typically on the order of 10 MB (10,000,000 bytes)—in the neighborhood of 500 MB for movies). The storage and rack space required to accommodate often large and sometimes rarely requested objects at every edge server can be cost prohibitive as the number of customers grows and the number of their objects increases. It may not even be possible to store a good working set of objects, for example a set of objects thought to be requested often and/or better suited to be served from an edge server, because of the size and changing demand for objects in the working set.

One obvious solution is to pre-populate edge servers with objects for which there will likely be a significant or high demand. However, it is difficult to predict popularity and difficult to manage pre-populating. A related solution is to associate objects with two or more domains depending on popularity of the object, e.g., one domain for popular objects (served from edge servers) and another domain for less popular objects (served from parent servers). However, this requires some way to pre-determine what objects are popular and what objects are less popular statically, and build that popularity into the domain name of the object. As with pre-populating, it is difficult to predict popularity and to manage assignment of domains based on such popularity determinations.

Other solutions fetch objects on demand. In such schemes, when a requested object is not available on a handling edge server, a connection is made between a parent server having the requested object and the handling edge server to fetch the requested object from the parent server. Such fetching suffers however from having to go through the parent path (the network path between the handling edge server and the parent server with the object) whenever a client requests an object that is not already at the particular edge server.

Fetching a large object to the handling edge server through a parent path can be slow. For example, there may be limited available bandwidth from the parent server to the handling edge server, i.e., sometimes the parent path has less bandwidth than even the network path from the edge server to the client (e.g., the "last mile" in a broadband network). If a parent server uses too much bandwidth copying an object to an edge server, this can create congestion at that parent server. If storage fill bandwidth is matched to client bandwidth, it is difficult to handle a second, faster client and if fetch is done using a streaming protocol (for instance, the Real-Time Streaming Protocol (RTSP) and Real-Time Transport Protocol (RTP) standards), the quality of the copy made can be hurt due to lost packets ("thinning").

Moreover, there may be an unreliable end-to-end parent path due to network congestion. And, if a parent server has to preprocess an object (e.g., to generate an image at a specific bit rate) or is otherwise busy with other tasks, this may further slow its ability to serve the request for the object fast enough. For example, if a client requests a bit rate higher than the parent-to-edge bit rate, delays will likely occur. Under such conditions, the parent server may fail, for example, to stream the object in time or to maintain the stream of an object at a requested bit rate thereby causing a thinned object, i.e., an object with lower quality due to lost packets in its transmission, to be populated at the edge server and delivered to subsequent clients requesting the same object.

Thus, it would be advantageous to populate edge servers with the most popular objects yet somehow serve the rest from parent servers with a goal to maximize the amount of object bits served from edge servers of the network. It would also be advantageous to populate edge servers by, for example, storage fill on demand when an object is popular enough, without having to make the end-user wait for such population. Therefore, it would be advantageous to provide a method and system for managed object replication and delivery over a network.

According to embodiments of the invention, a method and system for managed object replication and delivery over a network redirects, directly or indirectly, a client's request for an object that is not available at a best or optimal handling edge server of the network to a parent server of the network that has the requested object. So, where the requested object is not available at the handling edge server, the client's request is redirected directly to the parent server that can provide the requested object to the client or indirectly via one or more parent servers to a parent server that can provide the requested object to the client. The method and system further intelligently replicates the object to the edge server if the object is popular enough. Likewise, an object is removed from an edge server when the object is no longer popular. All redirection and replication operations are preferably transparent to the end-user and do not degrade the quality of service. Other embodiments of the invention are possible and some are described hereafter.

So, for example, under the framework described herein, a request for a streaming object will be served by a handling edge server if that handling edge server has a copy of that object. Otherwise, the request is redirected, directly or indirectly, to a parent server for service of the requested streaming object to the client. If the requested streaming object is popular, the object is replicated from a parent server that has the requested streaming object to the handling edge server so that the handling edge server will serve the object from the edge of the network when the object is requested in the future. If a streaming object is no longer popular, the object is removed from an edge server.

As used herein, replication generally refers to the permanent and/or volatile storage of an object in a server, particularly an edge server and if applicable, a parent server. Accordingly, the term replication will be considered synonymous to storing, caching and copying. In typical embodiments, replication of an object will usually refer to temporary storage of the object in an edge server and/or a parent server for an undefined duration.

A typical network for the managed object replication and delivery method according to embodiments of the invention is illustrated in FIG. 1. The network 100 comprises one or more parent server sites 120 and one or more edge server sites 130. The network also optionally has access to one or more origin server sites 110. The origin server sites are typically owned and/or maintained by the network provider's customers for storing and serving one or more objects. Each customer (content provider) may have its own origin server site. Furthermore, one or more clients 140 access the network to request one or more objects. A parent server site (or simply parent site or parent server) may comprise one parent server or a cluster of parent servers. Likewise, an edge server site (or simply edge site or edge server) may comprise one edge server or a cluster of edge servers and an origin server site (or simply origin site or origin server) may comprise one origin server or a cluster of origin servers. Typically, the network 100 is configured such that servers in a cluster share a common storage. In any event, configuration details of the parent server site, edge server site, and the origin server site are not important to the present invention.

In the typical network, the parent servers and edge servers are maintained by a network provider, wherein the parent servers are primarily used for storing and managing one or more objects and edge servers are primarily used for serving objects to clients. In some embodiments, all the objects are retrieved from origin servers and stored over one or more parent servers before any end-users can access each such object as the object is stored on the parent servers. Accordingly, in these embodiments, the origin servers play no significant role in the managed object replication and delivery method except to supply new and/or updated objects for storage on the parent servers. Moreover, only the parent servers communicate with the origin servers. In other embodiments, each requested object is replicated from one or more origin servers to one or more parent servers (and/or one or more edge servers) when the requested object becomes popular (as described in more detail below). In these embodiments, the origin servers play a more significant role in the managed object replication and delivery method to supply objects to parent and/or edge servers when requested. So, in these embodiments, the origin servers and parent servers communicate between each other and the origin servers and clients may also communicate between each other. In all of these embodiments, the communications relationships between origin servers and parent servers may be one-to-one, one-to-many or many-to-many.

Further, as shown in FIG. 1, the parent servers and edge servers communicate between each other, edge servers and clients communicate between each other and parent servers and clients communicate between each other. While in embodiments, as shown in FIG. 1, the edge servers have a one-to-one or one-to-many communications relationship with parent servers, edge servers may also have many-to-many communications relationships with parent servers. As discussed in more detail below, the edge servers act as the primary source of serving objects but if a requested object is not available at the edge server a parent server that has the requested object will serve the requested object to the clients. Also, FIG. 1 shows a single layer or level of parent servers and origin servers. As will be apparent to those skilled in the art, more than one layer or level of parent servers and/or origin servers may be used.

Figure 2:
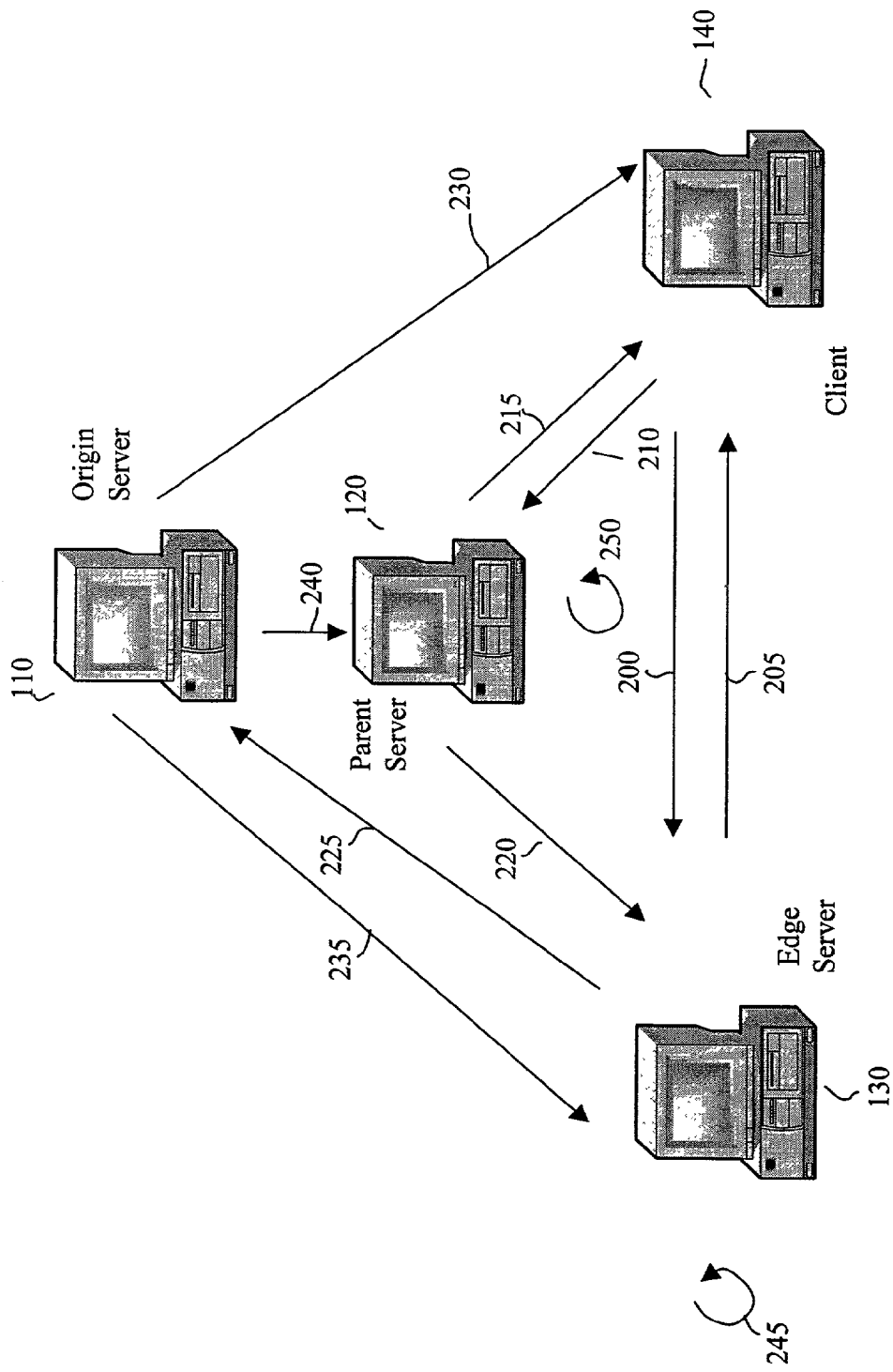
FIG. 2 is a high-level block diagram illustrating the data flows of managed object replication and delivery method according to embodiments of the invention.
Figure 3A:
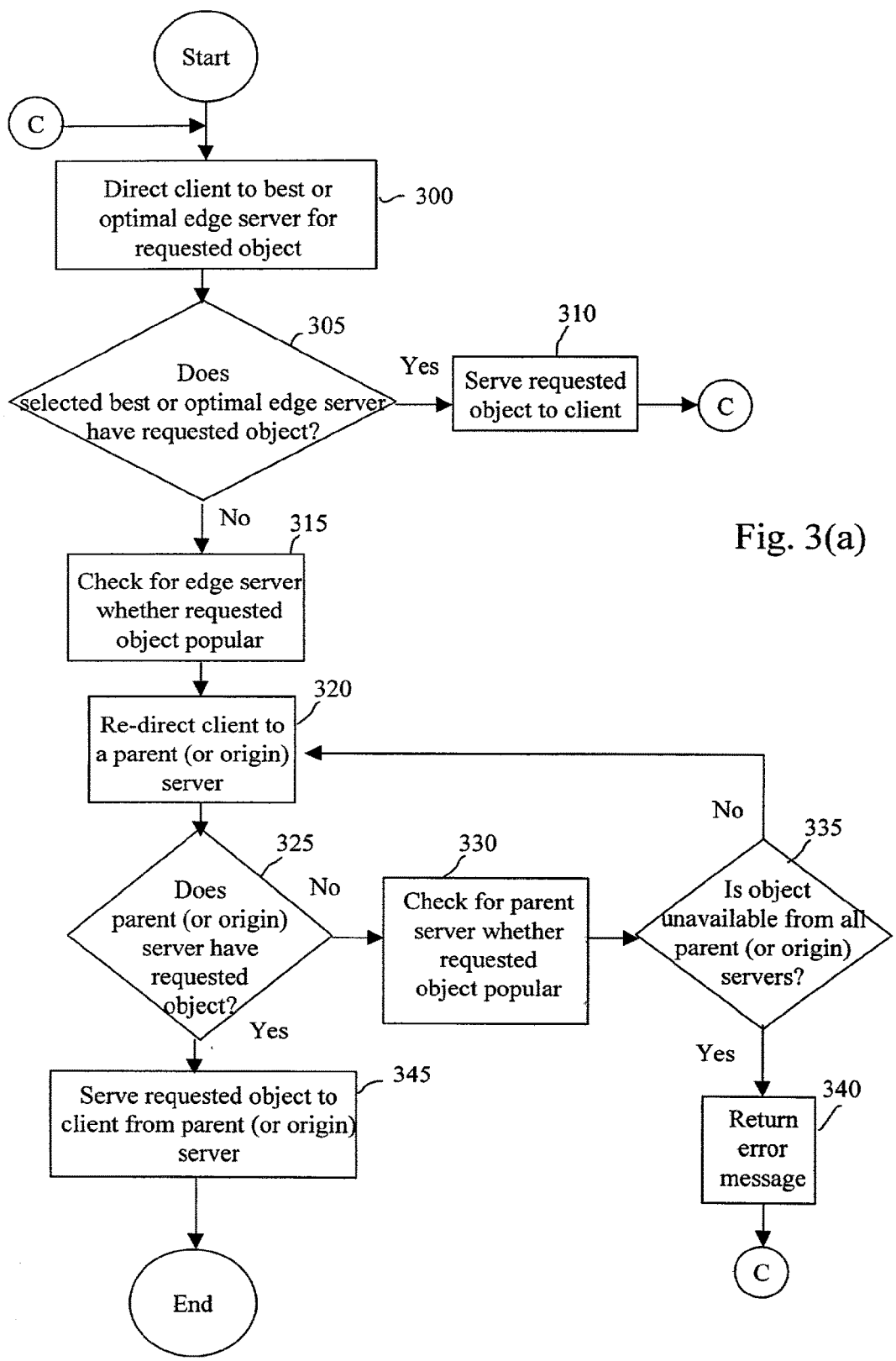
FIGS. 3(a), 3(b) and 3(c) are a flow chart of the managed object replication and delivery method and the object purging method according to embodiments of the invention.
Figure 3B:
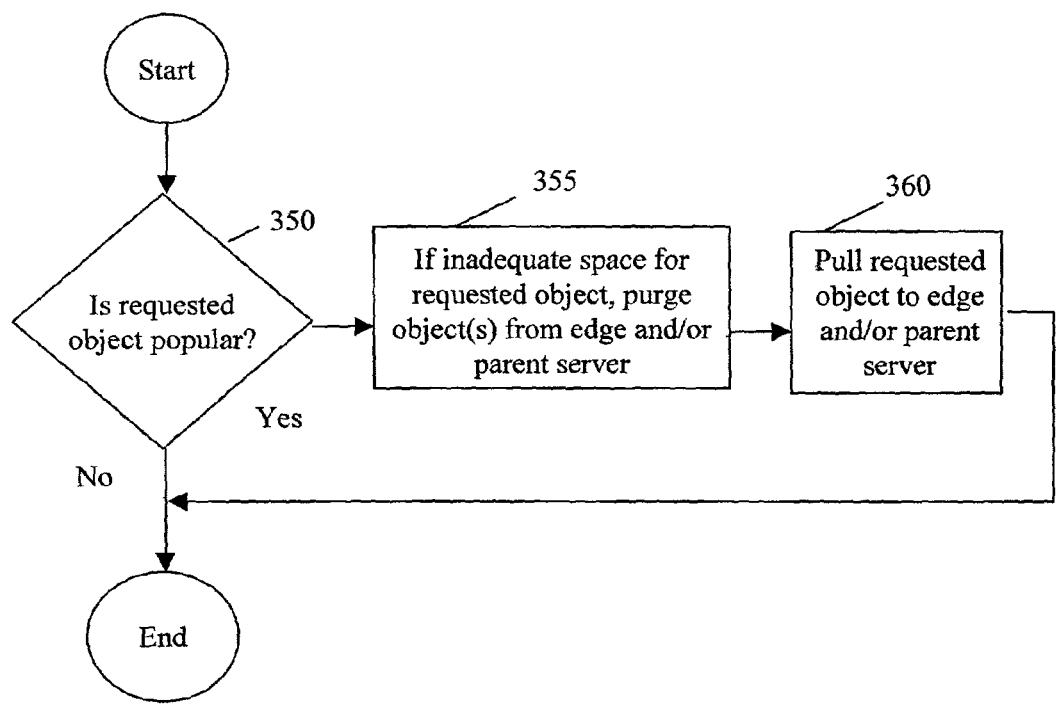
Figure 3C:
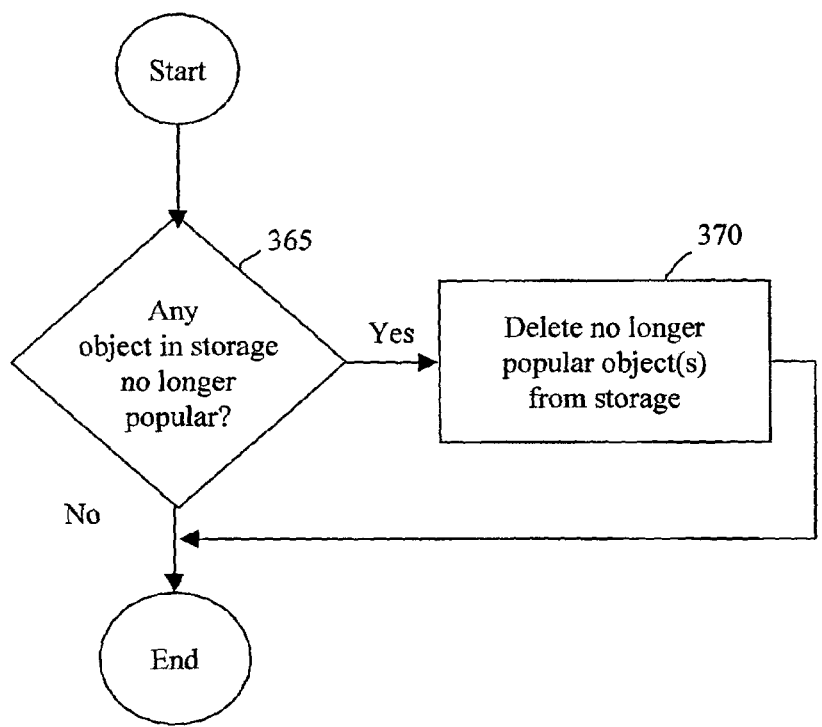

According to embodiments of the invention and referring to FIGS. 2, 3(a), 3(b) and 3(c), the method of managed object replication and delivery and the method of object purging is depicted. FIG. 2 depicts embodiments of the method in relation to a portion of the network 100, an origin server 110 and a client 140 as shown in FIG. 1. FIGS. 3(a), 3(b) and 3(c) depict embodiments of the method in flowchart form.

Initially, the method of managed object replication and delivery directs (at 200, 300) a client, requesting one or more objects, to an edge server in the network, whether or not the edge server has the requested object(s). Preferably, the client is directed to an optimal edge server, e.g., based on network traffic conditions and server load. As will be apparent to those skilled in the art, any number of currently known or future developed mechanisms may be used to select a best or optimal edge server. Determination of a best or optimal edge server preferably includes selection of an edge server most suitable for delivery of one or more objects to the client according to any number of currently known or future developed algorithms. For example, determination of a best or optimal edge server may be performed based on the likelihood of a copy of the requested object(s) being available at the candidate edge server, on the bandwidth between a candidate edge server and the client, on a best repeater selector (for example, as described in U.S. Pat. No. 6,185, 598) and/or on any number of other criteria.

The selected best or optimal edge server 130 determines (at 305) whether the edge server already has the requested object and, if so, serves (at 205, 310) the object to the requesting client 140. For example, the selected edge server 130 will check its storage to determine whether the requested object is available and if so, may serve the object to the requesting client 140.

If the selected edge server does not have the requested object, a check is initiated (at 315) for the edge server to determine whether the requested object is popular and if so, to replicate the popular requested object to the edge server. In embodiments, the method depicted in FIG. 3(*b*) and discussed in more detail below is employed to determine whether the requested object is popular and if so, to replicate the popular requested object to the edge server.

In embodiments, the checking of whether the requested object is popular and replicating the popular requested object to the edge server may be performed independently of one or more functions of the method of managed object replication and delivery, such as the checking if a server has the requested object and serving the requested object to the client if the server has the requested object or redirecting the client to a server that has the requested object (and serving the requested object to the client). Thus, in embodiments, the checking of whether the requested object is popular and replicating the popular object to the edge server may be performed in parallel with or before the performance of certain functions of the method of managed object replication and delivery such as the checking if a server has the requested object and serving the requested object to the client if the server has the requested object or redirecting the client to a server that has the requested object (and serving the requested object to the client). Advantageously, should the checking, redirecting and serving of the requested object fail, the checking of whether the requested object is popular and replicating the popular object to the edge server can manage the continued delivery of objects to clients from edge servers. Similarly, if the checking of whether the requested object is popular and replicating the popular object to the edge server should fail, the checking, redirecting and serving of the requested object can manage the continued delivery of objects from servers in the network.

Further, if the selected edge server does not have the requested object, the selected edge server directs (at 210, 320) the requesting client 140 to a parent server 120. Preferably the client 140 is redirected to a parent server that has the requested object and is able to serve (at 215, 345) the requested object to the client. If a parent server does not have (at 325) the requested object, a check is initiated (at 330) for the parent server to determine whether the requested object is popular and if so, to replicate the popular requested object to the parent server. In embodiments, the method depicted in FIG. 3(*b*) and discussed in more detail below is employed to determine whether the requested object is popular and if so, to replicate the popular requested object to the parent server. As with the check for the edge server, in embodiments, the checking of whether the requested object is popular and replicating the popular requested object to the parent server is performed independently of one or more functions of the method of managed object replication and delivery such as the checking if a server has the requested object and serving the requested object to the client if the server has the requested object or redirecting the client to a server that has the requested object (and serving the requested object to the client). Thus, in embodiments, the checking of whether the requested object is popular and replicating the popular requested object to the parent server may be performed in parallel with or before one or more functions of the method of managed object replication and delivery such as the checking if a server has the requested object and serving the requested object to the client if the server has the requested object or redirecting the client to a server that has the requested object (and serving the requested object to the client).

Further, if a parent server does not have the requested object, the parent server could itself use a redirection technique recursively (at 325, 335, 320) until a final parent server is reached that has the requested object. The parent server that has the requested object serves (at 215, 345) the object to the client. If the object is determined to be unavailable (at 335) (from all parent servers), an error message is returned (at 340) regarding the unavailability of the requested object.

As will be apparent to those skilled in the art, numerous methods are available to redirect a requesting client to another parent server, depending on the protocol(s) used to request the object. A handling edge server may request information from a database about to which parent server the client should be redirected. In an implementation, the edge server might have a local database, populated by pushes of redirection data from one or more servers in the network. The edge server may also simply query one or more servers in the network to identify one or more parent servers to which the client can be directed. When more than one parent server responds, the edge server may redirect the client to the parent server that responds to the query first, the edge server may redirect the client to the parent server that is topologically closest to the edge server in the network or the edge server may redirect the client to the parent server that represents the best or optimal candidate based on criteria such as network efficiency, bandwidth requirement and/or cost. Alternatively, an edge server may always go to default parent servers. Or, as discussed in relation to edge servers, a best or optimal parent server may be determined using any of the techniques outlined above. Redirection may be performed by simply sending the request onto a parent server or returning redirection information to the client for accessing the parent server. As will be apparent to those skilled in the art, any number of implementations may be used to provide the redirection information to the handling edge server.

In other embodiments, where the parent servers collectively are not populated with all of the objects and the network has access to the origin server of a requested object, the client may be redirected (at 225, 320) to the origin server if the requested object is not available on the parent servers. If the origin server has the requested object (at 325), the origin server would serve (at 230, 345) the object directly to the client (not shown in FIG. 1). Otherwise if the object is unavailable (at 335), an error message would be returned (at 340) regarding the unavailability of the requested object.

Referring to FIG. 3(*b*), when an edge and/or parent server determines (at 350) that a requested object is popular (by some measure of popularity) but the edge and/or parent server does not have a copy of the object, the edge and/or parent server initiates a pull of the object to the edge and/or parent server. So, for example, when the edge server determines (at 350) that a requested object is popular but the edge server does not have a copy of the requested object, the edge server initiates the replicating (at 220, 360) of the popular requested object to the edge server from a parent server that has the requested object. Similarly, for example, when a parent server 120 determines (at 350) that a requested object is popular but the parent server does not have a copy of the requested object, the parent server initiates the replicating (at 240, 360) of the popular requested object to the parent server from an origin server that has the requested object. Alternatively, a parent and/or origin server may receive information regarding object popularity, such as popularity determinations for objects or data about object popularity, from one or more edge and/or parent servers and may push popular objects to the edge and/or parent servers. So, for example, when the parent server determines (at 350) that a requested object is popular at an edge server but the edge server does not have a copy of the requested object, the parent server may initiate the replicating (at 220, 360) of the popular requested object to the edge server from the parent server. Similarly, for example, when the origin server determines (at 350) that a requested object is popular at a parent server but the parent server does not have a copy of the requested object, the origin server initiates the replicating (at 240, 360) of the popular requested object to the parent server from the origin server.

In some embodiments, if none of the parent servers has the requested object, the edge server initiates the replication (at 235, 360) of the popular requested object to the edge server from the origin server having the requested object (if the network has access to the origin server). Preferably, in each case, the replicated object is not served or further replicated until the object has been completely copied to the respective server. Optionally, such replicating may be utilized by and between the parent servers themselves to facilitate the reduction of the traffic to and from the origin server. Further, if the edge and/or parent server does not have adequate space for the popular requested object, one or more objects may be purged (at 355) from the edge and/or parent server to make space for the popular object. In embodiments, the method depicted in FIG. 3(c) and discussed in more detail below is employed to determine whether any object(s) in the edge and/or parent server is no longer popular and if so, to delete the no longer popular object(s) from the edge and/or parent server. Also, as will apparent to those skilled in the art, servers other than the edge and/or parent server for which an object is determined popular may perform the actual determination of whether an object is popular by using for example, popularity information provided by the handling edge and/or parent server. The popularity determinations can then be used to initiate replication (for example, pushing or pulling) of the object to the edge and/or parent server for the which the object is determined popular.

Referring to FIG. 3(c), if an object in a server's storage is no longer popular (at 365), the server may delete the object (at 370) from the storage. For example, an edge server may delete (at 245, 370) any objects from the edge server's storage that are no longer popular. Similarly, a parent server may delete (at 250, 370) any objects from the parent server's storage that are no longer popular. As will be apparent to those skilled in the art, the determining of whether any object(s) in the server's storage is no longer popular and if so, deleting the no longer popular object(s) from the server's storage may be performed independently of, for example in parallel with or before, one or more functions of the method of managed object replication and delivery. In embodiments, the no longer popular objects are removed from edge servers and, if the no longer popular objects are hosted on an origin server, from parent servers.

Determining Popularity

Any number of techniques may be used to determine the popularity of an object. Determining the popularity can be based on the number of requests. Popularity can also be based on the request rate. Popular objects typically have higher request rates or higher number of requests than unpopular objects. Popularity can also be determined by tracking the last X number of request times for an object and then use the difference between the current time and these request times to calculate a running average for how often the object is requested. Determining the popularity can also be gauged on the request rate for an object that is perhaps weighted for more recent requests for the object (which is a predictor that the object will be requested again). An exponential decay method and an artificial neural network could also be used to determine popularity of an object.

Figure 4:
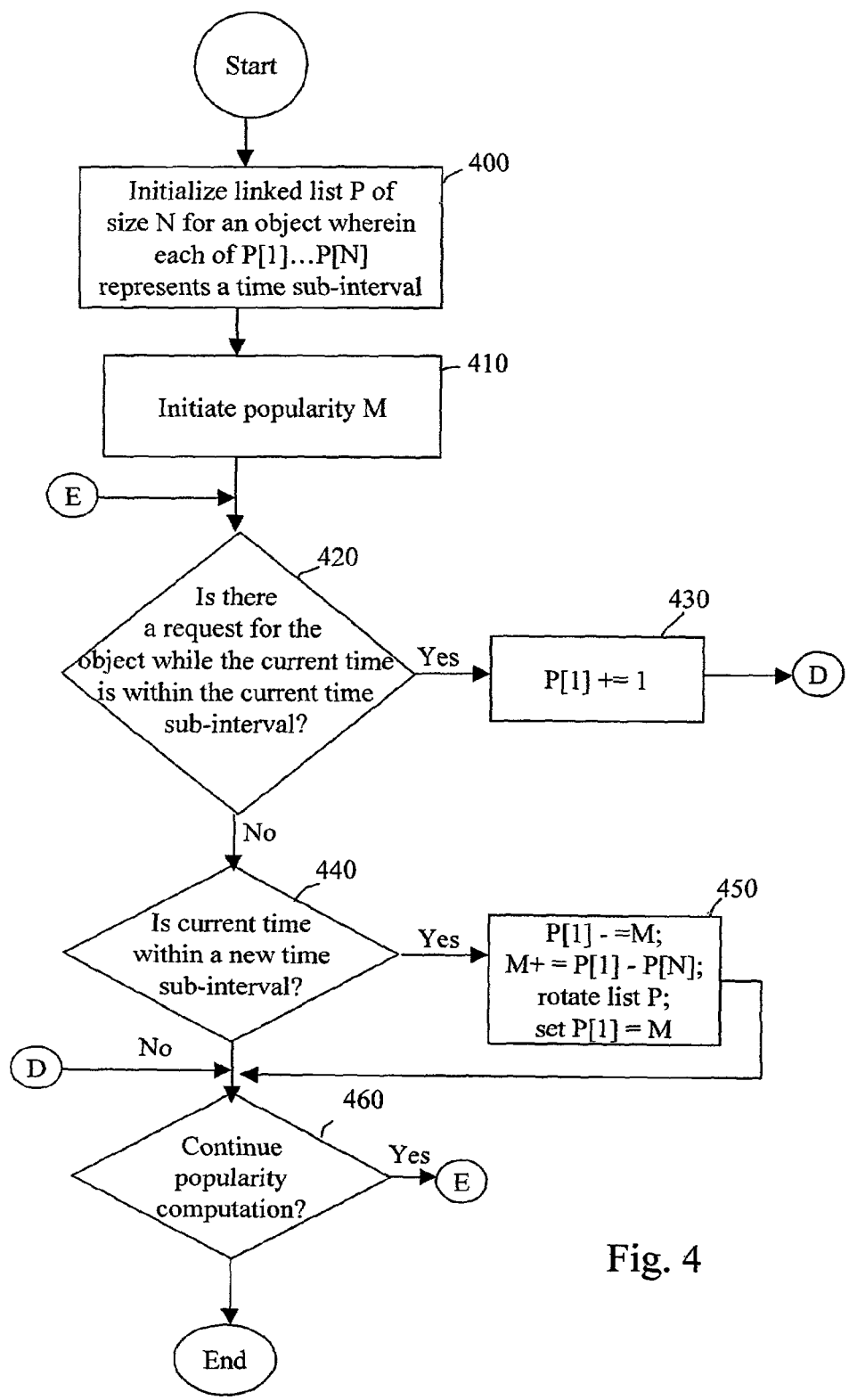
FIG. 4 is a flow chart of a popularity computation according to embodiments of the invention.

According to some embodiments of a popularity computation and referring to FIG. 4, the popularity of an object is based on the request rate of the object and computed over a sliding time window in a discrete manner. In these embodiments, the variable I denotes the time interval over which the popularity of an object is measured. The time interval is divided into N equal sub-intervals of duration I/N. As will be apparent, the time interval is not required to be equally divided and may instead be divided in other manners.

A linked list P of size N is created for each object. The value of N determines the quality of approximation. The smaller the value of N, the coarser the approximation. In some embodiments, the value of N is set to 5.

The first element P[1] of the list records the number of requests that arrived when the current time was within the first sub-interval, the second element P[2] records the number of requests that arrived when the current time was within the 2nd interval, and so on. When a new sub-interval arrives, the list is rotated such that P[I] becomes P[I+1] except for P[N] which becomes P[1], so, e.g., P[1] becomes P[2], P[2] becomes P[3], and P[N] becomes P[1]. After the rotation, the new P[1] is reset to zero. Accordingly, only the end time of the first sub-interval needs to be recorded and compared against the current time to check if the list should be rotated. For each new request within the sub-interval, P[1] is simply incremented by 1. In this way, the arrival time of each request need not be recorded.

In preferred embodiments, the popularity of an object is simply the sum of all numbers in the list. To make the computation more efficient, the sum of P[2]+P[3]+ . . . +P[N] is stored in a register M. The popularity can be then computed by adding P[1] to M. When a rotation occurs, the new value of M becomes M+=P[1]−P[N]. The popularity of an object may be queried constantly. So, to avoid the extra addition involved for each such inquiry, the value of P[1] can be set to M after the rotation. Then, the value of P[1] is the popularity of the object.

The popularity computation algorithm may be summarized as follows. The linked list P of size N for an object, wherein each of P[1] . . . P[N] represents a time sub-interval, is initialized (at 400). The popularity M is also initialized (at 410). If there is a request for the object while the current time is within the current time sub-interval (at 420), then the value of P[1] is incremented (at 430) by 1. If the current time is within a new time sub-interval (at 440), then the value of P[1] is decremented by the value of M, M+=P[1]−P[N], the list P is rotated and P[1] is set to the value of M (at 450). Then, provided the popularity computation is continued (at 460) e.g., the popularity computation is not terminated, the popularity computation algorithm repeats itself.

Initiating Replication

Furthermore, any number of techniques may be used to initiate replication of an object. An edge server and/or a parent server might replicate an object on the first request by a client for the object. Alternatively, the edge server and/or parent server may be tuned to wait until the edge server and/or parent server receives a specific number or range of requests for the object. In other implementations, the object may be pulled if the object is more popular (e.g., a higher request rate) than the least popular object currently in the storage. In yet another alternative, the replicating decision can be a function of the popularity of the object, the cost of storing the object, the cost of pulling the object from the network and any other relevant cost factors. However, the popularity of objects may change significantly with time. Initiating a pull decision of an object purely based on a fixed threshold does not capture this dynamic nature of popularity.

A replication policy that compares against the least popularity of replicated objects has its limitations, although the policy does not use a fixed threshold. Consider where the storage is only half full but all the replicated objects are extremely popular. Since only objects exceeding the least popularity of the replicated objects will be replicated under this replication policy, objects with moderate popularity will be rejected despite that there is plenty of storage space available and that the objects are reasonably popular.

Accordingly, a replication scheme should be able to automatically adjust the replication threshold by taking into consideration the dynamic nature of popularity and the fullness of the storage. If there are more popular objects than the storage capacity allows, the replication scheme should raise the threshold. If there is more available storage capacity, the replication scheme should decrease the threshold so that more objects can be stored.

Figure 5:
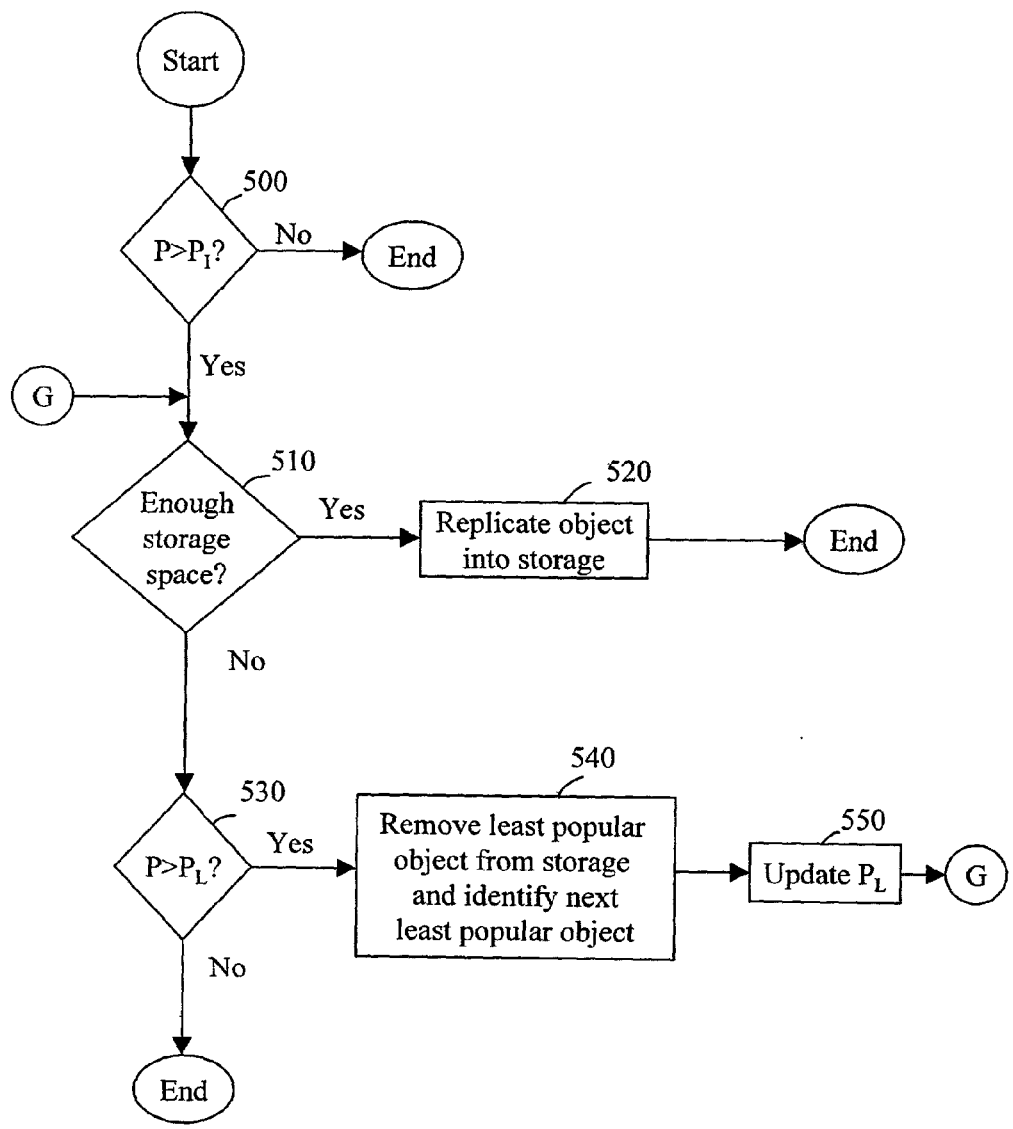
FIG. 5 is a flow chart of a replication scheme according to embodiments of the invention.

According to embodiments of a replication scheme and referring to FIG. 5, an object is replicated (at 520) into storage when the popularity P of the object is greater (at 500) than the initial threshold $P_I$ and when there is enough space (at 510) in the storage to replicate the object. If there is not enough storage to replicate the requested object, a replacement algorithm is performed in which the popularity P of the object is compared (at 530) against the popularity $P_L$ of the least popular object in the storage. If P is greater than $P_L$, the current least popular object is removed (at 540) from the storage to free up more storage space, the next least popular object is identified (at 540), the value of the least popularity is updated (at 550), and a new iteration begins by checking if there is enough storage space to store the requested object (at 510). The storage space freeing iteration is terminated when either 1) enough storage space has been freed up to accommodate the requested object or 2) the requested object is not as popular as the least popular object in the storage. In embodiments, the least popular objects are removed from edge servers and, if there are origin servers with a copy of the least popular objects, from parent servers. Where no origin servers exist with a copy of the least popular objects, least popular objects are not removed from parent servers in order to keep a copy of the least popular objects in the network.

Purging

Figure 6:
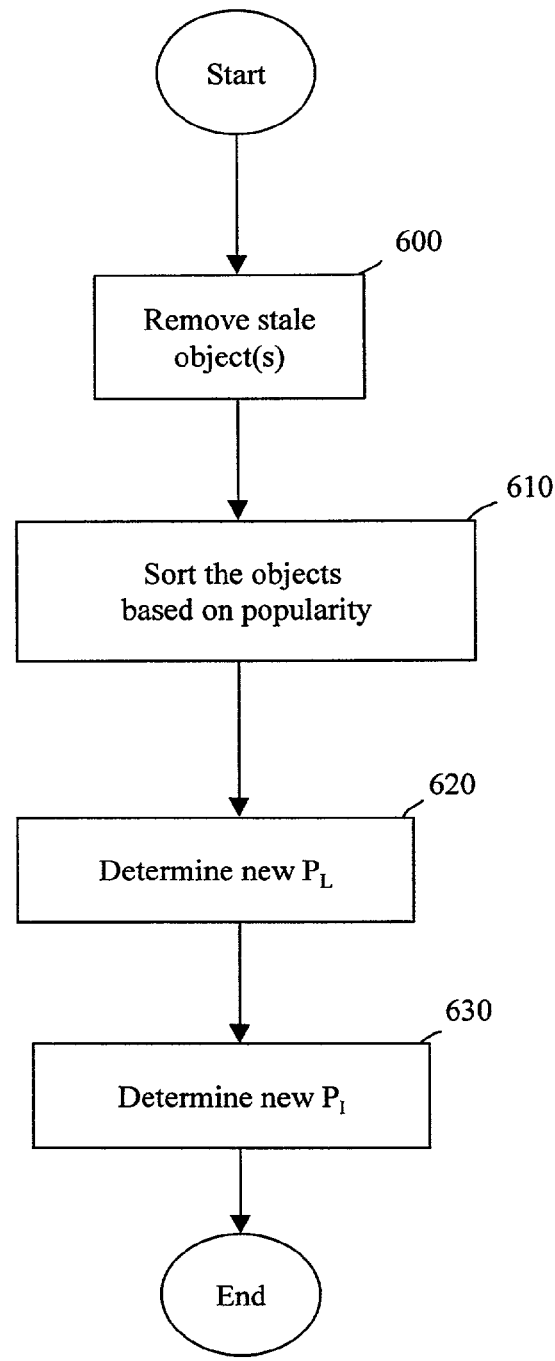
FIG. 6 is a flow chart of a purge scheme according to embodiments of the invention.

In some embodiments, the managed object replication and delivery method and system records the time on which an object was last requested. A purge scheme is invoked to clean up the storage of servers, for example, on a regular time interval basis or when a popular object is replicated to an edge and/or parent server but there is inadequate space at the edge and/or parent server. Referring to FIG. 6, in the purge scheme, all stale objects are removed from the storage (at 600), the remaining objects are sorted based on popularity (at 610), and the new values of $P_L$ and $P_I$ are determined (at 620, 630). An object is stale if its age (that is the time since the object was last requested) is over a pre-defined value, typically set to the duration of the sliding window used to measure the popularity multiplied by an adjustable factor. As will be apparent to those skilled in the art, the value may vary and indeed other staleness algorithms may be used. The popularity of the least popular object in the storage after purging is assigned as the new $P_L$. The new $P_I$ is determined by using the sorted popularity and is set to the popularity of the last object that can fit into the storage if more popular objects are replicated first. Typically, $P_L$ should be greater than or equal to $P_I$. If not, the value of $P_L$ is assigned to be the new $P_L$. In some embodiments, the purge process is implemented as a separate thread in a multi-thread system. In embodiments, the stale objects are removed from edge servers and, if there are origin servers with a copy of the stale objects, from parent servers. Where no origin servers exist with a copy of the stale objects, stale objects are not removed from parent servers in order to keep a copy of the stale objects in the network.

At the outset when the system starts and there is no popularity data available yet, the initial values of both $P_L$ and $P_I$ can be set to zero. This forces the replication scheme to store the objects on their first request, but the purge scheme that is run on a regular basis will adjust the values of $P_L$ and $P_I$ automatically. The initial values of $P_L$ and $P_I$ can also be set to other values. Indeed, the initial values of $P_L$ and $P_I$ can be determined by taking into consideration the cost of storage, the cost of fetching, and the cost difference in deliveries from different servers. In any case, the system allows the specification of minimum $P_L$ and $P_I$. If a computed $P_L$ or $P_I$ is smaller than the minimum specification, $P_L$ or $P_I$ is set to the minimum specification.

In some embodiments, to avoid or minimize stream thinning and other quality problems, storage fill is separated from data delivery. In this way, the data transfer between multiple sets of storages can tolerate a slower connection, and a server never streams an object unless the object is entirely in the storage. As will be apparent to those skilled in the art, it is possible to start streaming an object when there is enough data in the storage and that replication need not be completed before serving the object. Further, storage fill may be staged by copying to a separate location, then moving the copied data to a servable location when the data is complete.

Further, if an object is changed at an origin server, there may be a need to broadcast a message to remove the object at one or more parent servers and/or one or more edge servers. Similarly, if an object is changed at the parent server(s), there may be a need to broadcast a message to remove the object at one or more edge servers. In each case, future requests for the removed object would be handled as in the normal case where a requested object is not available at an edge server and/or a parent server.

Hardware and Software

Figure 7:
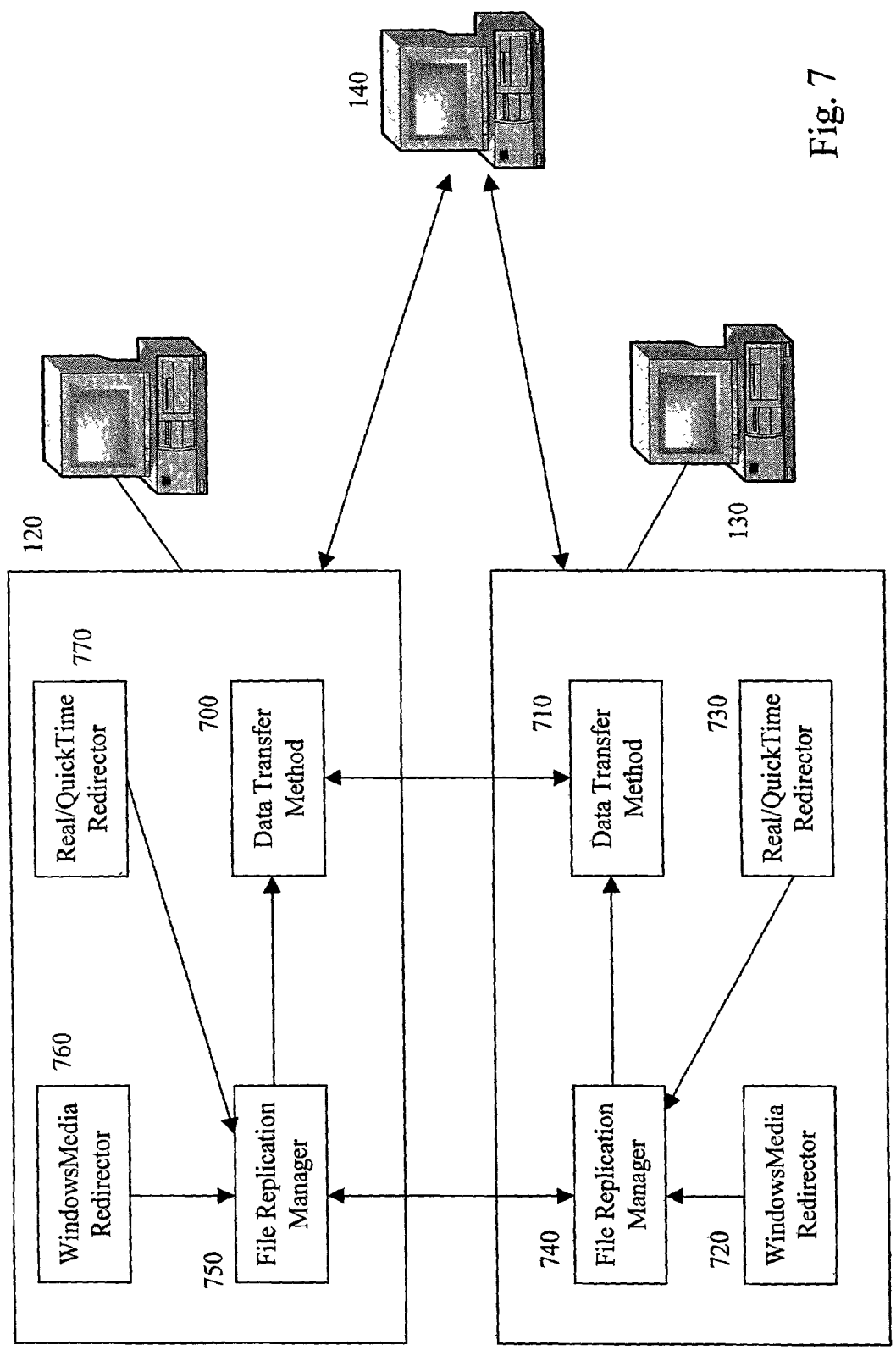
FIG. 7 is a block diagram of the managed object replication and delivery system according to embodiments of the invention.

In embodiments of the invention, referring to FIGS. 1 and 7, the system of managed object replication and delivery comprises one or more servers in a network designated as parent servers and one or more servers in the network designated as edge servers. In some embodiments, referring to FIG. 1, parent servers 120 have large storage capacity (on the order of 5 terabytes (TB)) while edge servers 130 have smaller storage space (ranging from 1 TB to 500 GB). One or more redirectors for implementing the method of managed object replication and delivery are installed on each edge server cluster. In some embodiments, one or more objects are replicated to one or more of the parent servers from the origin servers and then pulled from the parent servers to the edge servers as needed. In other embodiments, one or more objects are replicated to one or more of the edge servers and/or to one or more of the parent servers, from the origin servers as needed.

In some embodiments, a data transfer method 700, 710 is implemented to transfer data between parent servers and edge servers. The data transfer method supports the Transport Layer Security (TLS) protocol (described in the Internet Engineering Task Force (IETF) RFC 2246, located at "http://www.ietf.org/rfc/rfc2246.txt", incorporated by reference herein) to ensure communication privacy. Further, the implementation of the method for managed object replication and delivery supports three popular object formats, namely Apple Computer, Inc.'s QuickTime™, RealNetworks, Inc.'s Real™, and Microsoft Corporation's WindowsMedia™ formats for streaming of requested object(s). As will be apparent to those skilled in the art, any number of other protocols and object formats may be used.

Further, in some embodiments, a number of software components are used to facilitate the method of managed object replication and delivery. A first component is a WindowsMedia redirector 720, 760 which is a service running on the Microsoft Windows NT operating system that processes requests from a Windows Media player and performs the redirection of the request for Windows Media objects. The WindowsMedia redirector is provided on edge servers and parent servers. Currently, the Microsoft Media Server (MMS) protocol is used for streaming of Windows Media objects and that protocol does not support redirection. To provide redirection for the streaming of Windows Media objects, the uniform resource identifier (URI) hyperlinks at the customer's site for such streaming Windows Media objects are modified. URIs as used herein generally have the following form (defined in detail in T. Berners-Lee et al, Uniform Resource Identifiers (URI), IETF RFC 2396, August 1998, located at "http://www.ietf.org/rfc/rfc2396.txt", incorporated by reference herein): scheme://host[port]/uri-path where "scheme" can be a symbol such as "http" (see Hypertext Transfer Protocol—HTTP/1.1, IETF RFC 2616, located at "http://www.ietf.org/rfc/rfc2616.txt", incorporated by reference herein) for an object on a Web server or "rtsp" (see Real Time Streaming Protocol (RTSP), IETF RFC 2326, located at "http://www.ietf.org/rfc/rfc2326.txt", incorporated by reference herein) for an object on a streaming server. Other schemes can also be used and new schemes may be added in the future. The port number "port" is optional, the system substituting a default port number (depending on the scheme) if none is provided. The "host" field maps to a particular network address for a particular computer. The "uri-path" is relative to the computer specified in the "host" field. An uri-path is typically, but not necessarily, the path-name of a file in a media server directory. In a preferred embodiment, the HTTP protocol is used to effect the redirection of WindowsMedia objects. Therefore, the "scheme" field of the URIs of the WindowsMedia objects is changed from "mms" to "http". For example, the URI for a sample object "sample.asf" in the Windows Media Advanced Streaming Format (ASF) will have a new URI of the form "http://host/path/sample.asf". For objects using Windows Media ASX scripting, a sample URI for the "meta.asx" object will be in the form "http://host/?www.customer.com/path/meta.asx", where "customer" is the name of the content provider of "meta.asx". All URIs contained within the "meta.asx" object remain unchanged. Upon receiving the request "http://host/path/sample.asf", the WindowsMedia redirector would respond to the request with the following example ASX script: TABLE-US-00001<ASX version="3.0"><Entry><Ref href="mms://servername/path/sample.asf"/></Entry></ASX> in the message body, if the requested object is found available either locally or on another server (parent or origin). In this example, "servername" is or resolves to the Internet Protocol (IP) address of a media server that will serve the requested object to the requesting client. If the requested object cannot be found, the WindowsMedia redirector would respond to the request with the following example ASX script: TABLE-US-00002<ASX version="3.0"><Entry><Ref href="http://redirname/path/sample.asf"/></Entry></ASX> in the message body, where "redirname" is or resolves to the IP address of the redirector of a parent server, to trigger another round of redirection. A final round of redirection is reached when none of the parent servers (and the origin server, if applicable) has the requested object. In this case, the redirection process is terminated, and a "not found" error message is sent to the requesting client. Requests for ASX objects are processed in a similar way. Upon receiving the request for the sample object "meta.asx", the WindowsMedia redirector checks the availability of the object pointed to by each URI inside "meta.asx" and rewrites the URI of each object accordingly. Then the WindowsMedia redirector sends a response to the request with the rewritten "meta.asx" in the message body of the response. The URI rewriting is done as follows. If a requested object, for example, "file.asf", is found available locally or on another server, the corresponding URI would be rewritten to "mms://servername/path/file.asf", where "servername" is or resolves to the IP address of the media server that will serve the requested object to the requesting client. If "file.asf" cannot be found, the corresponding URI is rewritten to "http://redirectorname/path/file.asf", where "redirname" is or resolves to the IP address of a parent server redirector.

Another component is a Real/QuickTime redirector 730, 770 which is an application that processes Real-Time Streaming Protocol (RTSP) requests from a Real or QuickTime player for one or more objects and performs the redirection of the method for Real and QuickTime objects. The Real/QuickTime redirector is provided on edge servers and parent servers. The RTSP, described in detail in the IETF RFC 2326, is used for streaming Real and QuickTime objects, and the "REDIRECT" method supported in that protocol is used to effect redirection. A redirect request informs the client that it must reconnect to another server location and provides for the client the URI of that new server in the redirect request.

A best or optimal server selection mechanism is also provided (not shown in FIG. 7). The best or optimal server selection mechanism includes selection of an edge server most suitable for delivery of one or more objects to the client according to any number of currently known or future developed algorithms. In addition to redirection to a best or optimal edge server for handling a client request for an object, the best or optimal server mechanism may also be applied to trigger one or more further redirections to one or more parent server(s) when a requested object is not available at the handling edge server. In an implementation, to effect this operation, the hostname part of the URI for a requested object is modified. For example, in the link "http://customer-wm.fpondemand.net/customer/sample.asf", "customer-wm.fpondemand.net" would be changed to "parent-wm.fpondemand.net" forcing the request to go through a further round of best or optimal server selection against parent servers only. In such embodiments, to effect best or optimal parent server selection, the parent-edge server topology is defined and the best or optimal server selection mechanism is provided a parent server table defining the relationships of such a topology. In some embodiments, the best or optimal server selection mechanism is similar to the best repeater selector described in U.S. Pat. No. 6,185,598.

A file replication manager application 740, 750 is also provided that manages object replication to and object removal from storage, retrieves objects from parent servers for replication to edge server storage, and performs storage cleanup as needed. The file replication manager is provided on edge servers and parent servers. In some embodiments, the file replication manager application uses the data transfer method and is in communication with the WindowsMedia and Real/QuickTime redirectors to provide, if available in the storage, objects requested by those redirectors.

In some embodiments, the message communicated between a WindowsMedia or a Real/QuickTime redirector and a file replication manager and between file replication managers is encapsulated using the User Datagram Protocol (UDP). This allows address handling and delivery to be handled by UDP and facilitates fast communication. Since UDP does not guarantee delivery, the message header contains a message number to be used to confirm that a response is to the current query, and not to a previous query. In addition, MD5 (See, e.g., Rivest, R., "The MD5 Message Digest Algorithm", IETF RFC 1321, April 1992) is supported to provide a basic level of security. The MD5 hash is generated by running a MD5 hash algorithm on the message number, message, and a secret pass phrase only shared by components of the system of managed object replication and delivery. When a message is received, the MD5 hash of the message number, message, and secret pass phrase, is computed and compared against the MD5 hash provided in the message. If these two MD5 hashes do not match, the message is invalid, and will be discarded.

As will be apparent to those skilled in the art, FIG. 7 represents only some embodiments of the system according to the present invention. Many variations for implementing the system according to the teachings of the present invention are possible and are all within the scope of the invention.

Chunking

An extension of the above method and system is to provide chunking. Studies of log data show that, even for popular objects, a good percentage of requests for such objects exit before the object is completely served. To exploit this kind of object usage and further enhance the performance of the network, objects can be segmented into chunks and initial chunks of an object can be given preferential treatment in the replication scheme. For example, only the initial chunks of a object are replicated when a replication admission decision is made and the remaining chunks of the object are pulled to the storage only if the client does not exit before a certain amount or number (e.g., 90%) of the initial chunks of the object are served. The initial chunks of an object can be left in the storage even when the object becomes unpopular. By partitioning streams in this manner, a first part of an object can be served from edge servers quickly, even if most of the object stream must be fetched from a parent server or origin server.

Object Retention and Staleness

Optionally, some or all of the objects may be permanently retained in edge server storage or be retained depending on a quota. Similarly, a configurable or automatically adjusting threshold for storage filling and deletion may be provided.

Also, an edge server may be configured to determine whether a requested object in a server's storage is fresh and serve the requested object only when the object is not stale. In some embodiments, a file is maintained which lists the maximum storage age and storage quota in order to facilitate determining whether a requested object is fresh. If a request is received for a stale object a redirect is initiated to the relevant parent server or origin server to provide the requested object and a storage refresh will be performed if the requested object is popular.

Peers

Also, edge server storage fills of objects may be served by other peer edge servers instead of a relevant parent server or origin server. If a popular object has already been replicated to an edge server filling a new edge server request for that object from one of the peer edge servers may be more efficient than the parent server or origin server. Since there are typically more edge servers than parent servers and origin servers, there is an increased likelihood that a peer edge server may be closer in terms of network distance than a relevant parent server or origin server. Moreover, such peer edge server storage fills could also lessen the burden on the parent servers or origin servers.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the invention is not limiting of the invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the invention described herein; the operations are machine operations. Useful machines for performing the operations of the invention include general purpose digital computers, special purpose computers or similar devices.

Each operation of the method may be executed on any general computer, such as a mainframe computer, personal computer or the like and pursuant to one or more, or a part of one or more, program modules or objects generated from any programming language, such as C++, Perl, Java™, Fortran, etc. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a processor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations described herein without departing from the spirit of the invention. For instance, in certain cases, the operations may be performed in differing order, or operations may be added, deleted or modified.

Embodiments of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device or computer program product may include, but is not limited to, CD-ROM, CD-R, CD-RW, diskettes, tapes, hard drives, computer system memory (e.g., RAM or ROM), and/or the electronic, magnetic, optical, biological or other similar embodiments of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to any or all methods of the invention and/or to structure its components in accordance with a system of the invention.

Embodiments of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or the system may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to certain embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

We claim:

1. In a content delivery network having (CDN) comprising a plurality of servers, a computer-implemented method for handling replication of objects on the plurality of servers, the method comprising,
    creating a linked list of size (N) for a first object, wherein size (N) represents a total number of time sub-intervals each having an equal duration in time;
    initializing a dynamic measure of popularity for the first object;
    initializing the linked list for the first object, thereby commencing count of the first time sub-interval,
    at the conclusion of the first time sub-interval, incrementing the dynamic measure of popularity by a number of client requests for the first object made during the first time sub-interval;
    at the conclusion of each subsequent time sub-interval, incrementing the dynamic measure of popularity by a number of client requests for the first object made during each subsequent time sub-interval; and
    replicating at least some of the first object on at least a first server when the dynamic measure of popularity of the first object exceeds a dynamic replication threshold based at least in part on a measure of capacity associated with the first server.

2. The method of claim 1, wherein the first object is segmented in to chunks, including initial chunks and remaining chunks, and wherein the step of replicating replicates only initial chunks of the first object.

3. The method of claim 2, wherein the remaining chunks of the first object are selectively replicated based at least in part on how many of the initial chunks are served to a client.

4. The method of claim 1, wherein the measure of capacity associated with the first server comprises a measure of storage available on the first server.

* * * * *